(12) United States Patent
Shimada et al.

(10) Patent No.: US 6,335,522 B1
(45) Date of Patent: Jan. 1, 2002

(54) OPTICAL PROBE HAVING A REFRACTIVE INDEX MICRO-LENS AND METHOD OF MANUFACTURING THE SAME

(75) Inventors: Yasuhiro Shimada, Hadano; Takayuki Yagi, Yokohama; Takayuki Teshima, Atsugi; Ryo Kuroda, Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/426,946

(22) Filed: Oct. 26, 1999

(30) Foreign Application Priority Data

Oct. 28, 1998 (JP) .......................... 10-322911
Oct. 1, 1999 (JP) .......................... 11-281503

(51) Int. Cl.[7] .............................................. G02B 7/04
(52) U.S. Cl. .................................. 250/201.3; 250/307
(58) Field of Search ........................... 250/201.3, 306, 250/307, 216, 234, 235

(56) References Cited

U.S. PATENT DOCUMENTS 6,101,165 A  *  8/2000  Korogi et al. .............. 369/126

FOREIGN PATENT DOCUMENTS

JP    9-269329    10/1997
WO    WO 96/03641    2/1996

OTHER PUBLICATIONS

"Near–Field Optical Data Storage Using a Solid Immersion Lens", B.D. Terris, et al., Applied Physics Letters, vol. 65, No. 4, American Institute of Physics, pp. 388–390, Jul. 25, 1994.
"Solid Immersion Microscope", S.M. Mansfield, et al., Applied Physics Letters, vol. 57, No. 24, American Institute of Physics, pp. 2615–2616, Dec. 10, 1990.
"New Form of Scanning Optical Miscroscopy", R.C. Reddick, et al., Physical Review B, Condensed Matter, Vol. 39, No. 1, 3rd Series, The American Physical Society, pp. 767–770, Jan. 1, 1989.
"Near–Field Optical–Scanning Microscopy", U. Durig, et al., Journal of Applied Physics, vol. 59, No. 10, American Institute of Physics, pp. 3318–3327, May 15, 1986.
"Atomic Force Microscope", G. Binnig, et al., Physical Review Letters, vol. 56, No. 9, pp. 930–933, Mar. 3, 1986.

* cited by examiner

Primary Examiner—Que T. Le
(74) Attorney, Agent, or Firm—Fitzpatrick, Cella, Harper & Scinto

(57) ABSTRACT

An optical probe which comprises a substrate, an elastic body supported by the substrate and having a free end, a projection having a micro-aperture and arranged at the free end of the elastic body, and a refractive index micro-lens also arranged at the free end of the elastic body and adapted to focus light to the micro-aperture.

20 Claims, 15 Drawing Sheets

FIG. 4
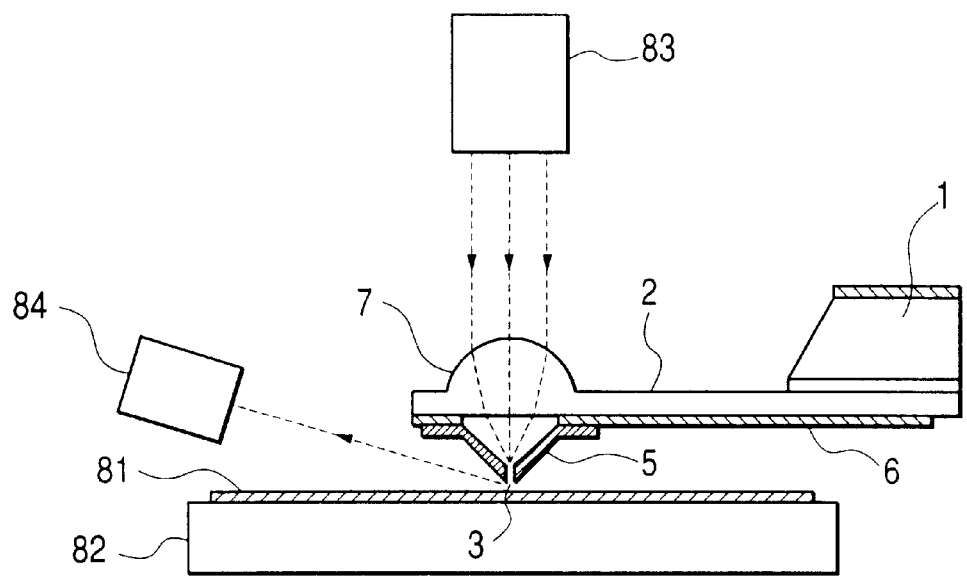
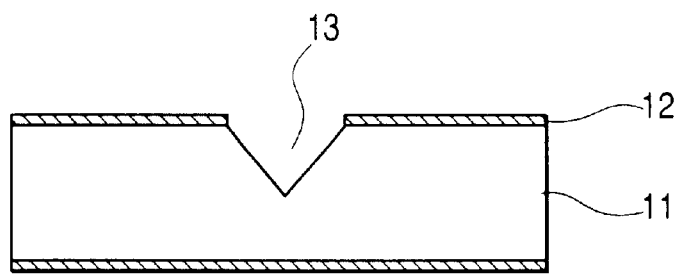
FIG. 5A
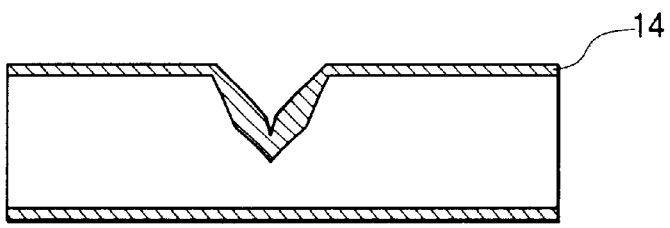
FIG. 5B
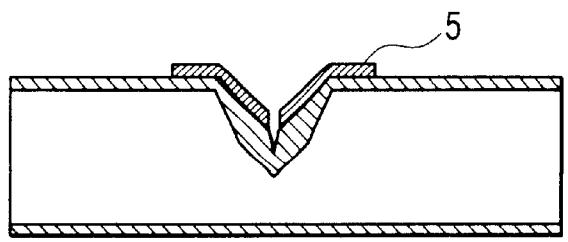
FIG. 5C

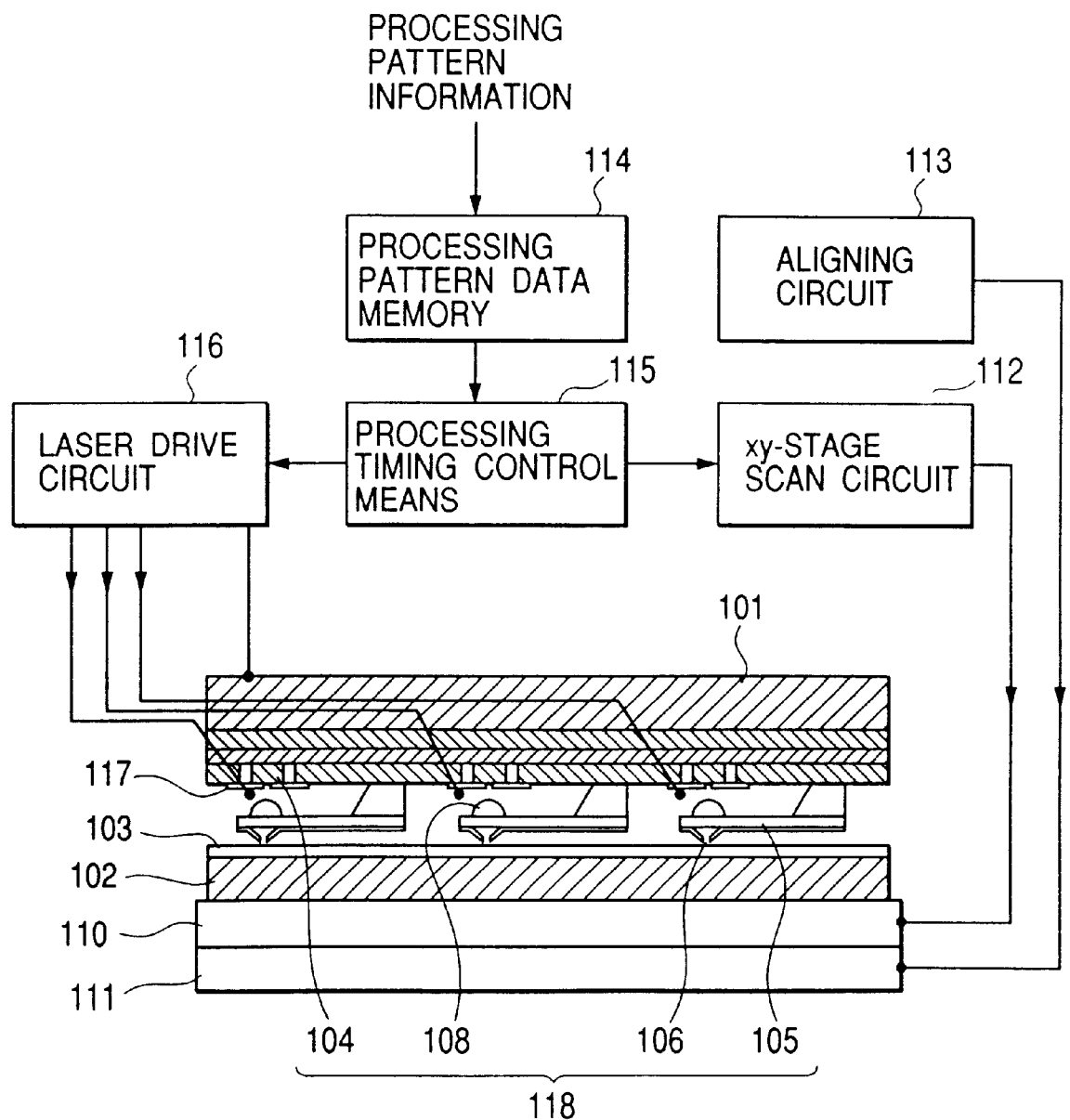

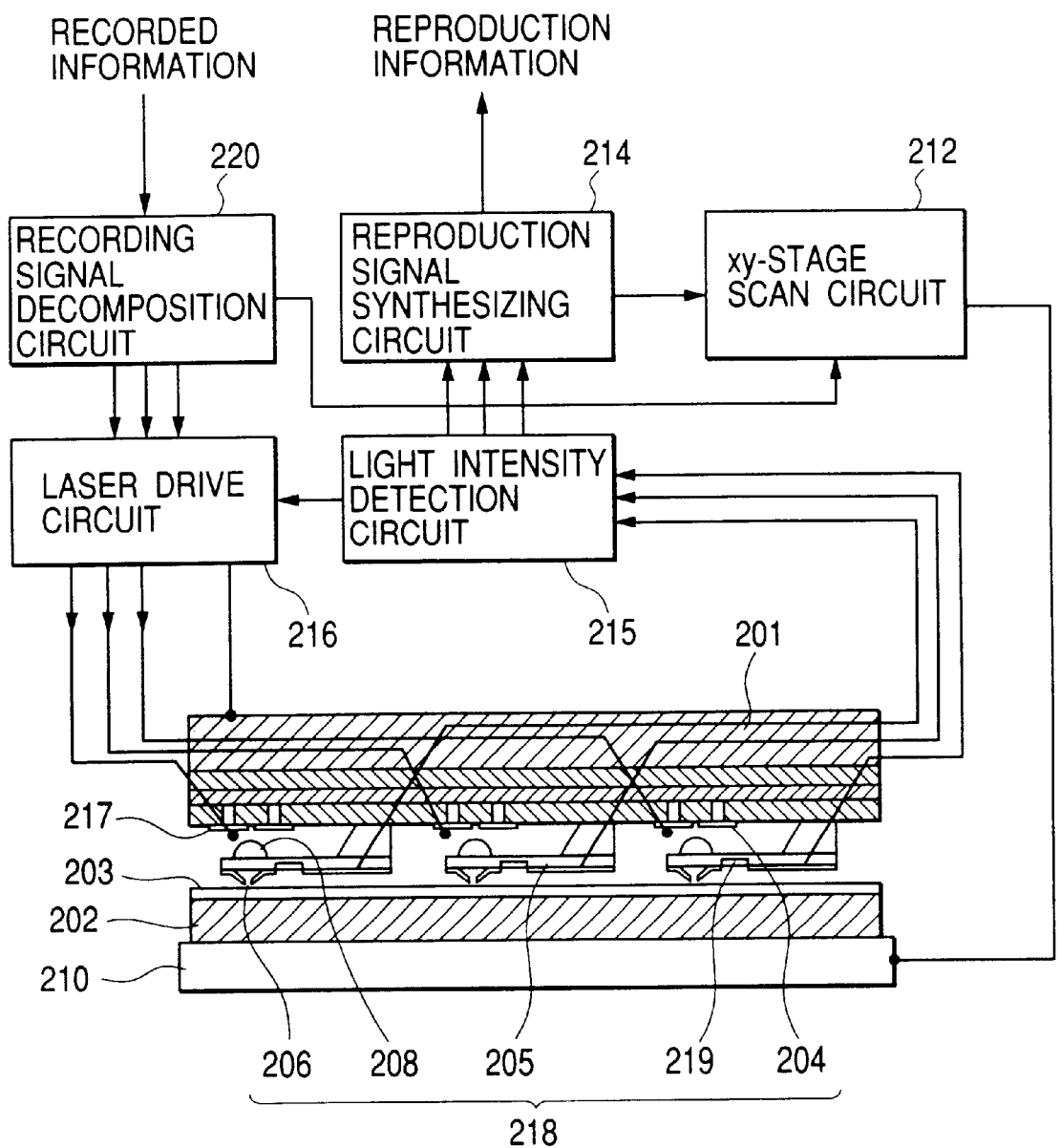

OPTICAL PROBE HAVING A REFRACTIVE INDEX MICRO-LENS AND METHOD OF MANUFACTURING THE SAME

BACKGROUND OF THE INVENTION

1. Field of the Invention

This invention relates to an optical probe and also to a method of manufacturing the same. More particularly, the present invention relates to a probe to be suitably used in a near field optical microscope for the purpose of emitting evanescent light and also to a method of manufacturing such a probe.

2. Related Background Art

The recent invention of the scanning tunnelling microscope (hereinafter referred to as "STM") made it possible to visually observe the electronic structure of the surface atoms of an electroconductive specimen [G. Binnig et al. Phys. Rev. Lett., 49, 57 (1982)] so that now a real space image of a specimen is visually observable with an enhanced level of resolution, whether it is crystalline or amorphous. Since then, massive research efforts have been paid on the scanning probe microscope (hereinafter referred to as "SPM") particularly in the technological field of evaluation of fine structures of various materials. The SPM includes the scanning tunneling microscope (STM), the atomic force microscope (AFM) and the magnetic. force microscope (MFM) that are adapted to scrutinize the surface structure of a specimen by utilizing the tunnel current, the atomic force, the magnetic force or the light, whichever appropriate, produced there when the probe thereof having a micro-projection is brought close to the specimen.

Additionally, the scanning near field optical microscope (hereinafter referred to as SNOM) has been developed on the basis of the STM. It detects the evanescent light seeping out of the micro-aperture of the front end of a sharp probe and irradiating the surface of a specimen by means of an optical probe in order to observe the surface of the specimen [Durig et al., J. Appl. Phys. 59, 3318 (1986)].

The photon STM is a type of SNOM also developed recently [Reddick et al., Phys. Rev. B 39, 767 (1989)] and adapted to cause a beam of light to strike the rear surface of a specimen by way of a prism under the condition of total reflection and detect the evanescent light seeping out from the front surface of the specimen by means of an optical probe in order to observe the surface of the specimen.

Probes to be used for near field optical microscopes include those using an optical fiber having a pointed front end and a micro-aperture formed there and those using a cantilever and a probe arranged at the free and thereof for the purpose of irradiation of light or photodetection. Particularly, the cantilever type probe provides various advantages including that a number of probes can be arranged in an array for integration by means of a silicon process and that it can operate as AFM.

An optical probe to be used for a near field optical microscope is provided at the front end thereof with a micro-aperture that has a diameter smaller than the wavelength of light and does not allow any propagated light to pass therethrough. It is adapted to collect optical information with a level of resolution higher than the wavelength of light by means of the evanescent light seeping out from the microaperture. However, the light seeping out from the micro-aperture is very weak and hence requires the use of a high sensitivity detector for detecting scattered light originating from the evanescent light. In other words, for a probe having a micro-aperture, the improvement of the resolution and that of the efficiency and the sensitivity are a sort of trade-off. It is, therefore, highly important to make the light coming from a light source to efficiently get to the micro-aperture of such a probe.

As an attempt for improving the efficiency of exploitation of light, there has been proposed the use of a lens for focussing the light coming from a light source external to the probe to a spot located close to the micro-aperture as the lens is arranged between the light source and the micro-aperture (International Patent Application WO9603641A1). The patent document describes a first instance of arranging a probe at the free end of a cantilever and a refractive index lens at a position remote from the cantilever and a second instance of arranging a probe at the free end of a cantilever and a Fresnel lens on the cantilever.

The above cited first instance is accompanied by a problem that the distance between the lens and the micro-aperture varies to shift the focal point of the lens relative to the micro-aperture as the cantilever is displaced because the lens is not located on the cantilever. When observing a specimen by means of a probe, using a cantilever, the gap between the specimen and the probe can be controlled either by holding the is cantilever in contact with the specimen or by oscillating the cantilever while scanning the specimen. However, with either arrangement, the cantilever can be displaced to change the distance between the lens and the micro-aperture. This means that the quantity of light collected by the micro-aperture varies. In other words, the intensity of light irradiating the surface of the specimen fluctuates and the scattered light being observed is affected by the fluctuations to make it difficult to reliably observe the specimen.

On the other hand, the above cited second instance is accompanied by a problem of a poor focussing efficiency due to the use of a Fresnel lens. While a Fresnel lens can be prepared by means of a lithography technique applied to a plane, it Involves a large loss of light due to diffraction of light bending away from the focal point and. scattering of light along the lateral sides of the grating. Additionally, the number of zones that can be arranged on a small cantilever is limited to make it difficult to collect light efficiently. Still additionally, the zone size of a Fresnel lens is highly dependent on the wavelength of light because it is determined as a function of the wavelength of light.

SUMMARY OF THE INVENTION

In view of the above identified problems, it is therefore an object of the present invention to provide an optical probe comprising a cantilever, a projection having a micro-aperture and arranged at the free end of the cantilever and a focussing lens also arranged at the free end of the cantilever. With such an arrangement, the distance between the micro-aperture and the lens does not vary if the cantilever is deflected so that the lens shows an improved focussing efficiency. Additionally, the optical probe is practically independent of the wavelength of light.

Another object of the present invention is to provide a method of manufacturing an optical probe, which is simple and provides a good reproducibility and a high processing precision. Optical probes manufactured by a method according to the invention can be arranged in array to form an optical head.

According to a first aspect of the invention, the above objectives are achieved by providing an optical probe including a substrate, an elastic body supported by the substrate and having a free end, a projection having a micro-aperture and arranged at the free end of the elastic body, and a refractive index micro-lens also arranged at the free end of the elastic body and adapted to focus light to the micro-aperture.

According to a second aspect of the invention, there is provided a method of manufacturing an optical probe including the steps of arranging an elastic material on a substrate, forming a refractive index micro-lens in contact with the elastic material on the substrate, forming a junction layer on the elastic material, forming a projection with a micro-aperture on the junction layer, and producing an elastic body having a free end out of the elastic material by removing part of the substrate.

BRIEF DESCRIPTION OF THE DRAWINGS

FIG. 4 is a schematic illustration of a near field optical microscope comprising the first embodiment of the optical probe.

FIGS. 5A, 5B and 5C are schematic cross sectional views of a second embodiment of an optical probe according to the invention and illustrating part of the manufacturing steps.

FIG. 15 is a schematic block diagram of a photolithography apparatus comprising optical probes according to the invention.

FIG. 16 is a schematic block diagram of a storage apparatus comprising optical probes according to the invention.

DESCRIPTION OF THE PREFERRED EMBODIMENTS

Now, the present invention will be described by referring to the accompanying drawings that illustrate preferred embodiments of the invention.

Figure 1:
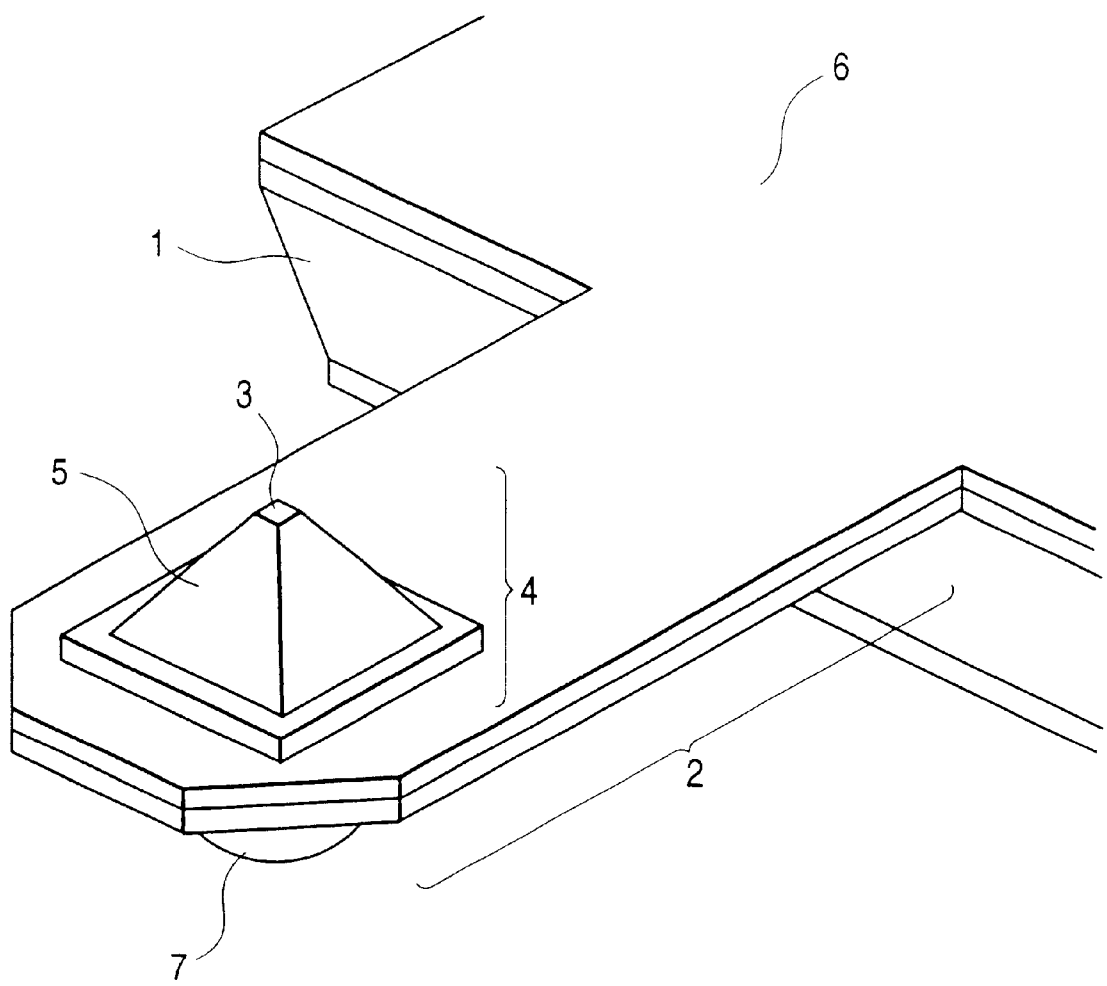
FIG. 1 is a schematic perspective view of a first embodiment of an optical probe according to the invention, which is shown in Example 1.

FIG. 1 is a schematic perspective view of a first embodiment of an optical probe according to the invention.

The probe is adapted to irradiate a minute region with light and comprises a substrate 1, a cantilever 2 supported on the substrate 1, a hollow pyramidal projection 4 arranged at the free end of the cantilever 2 and formed from a light-shielding layer 5 with a micro-aperture 3 at the front end thereof and a semispherical micro-lens (refractive index lens) 7 arranged vis-a-vis the micro-aperture 3 so that the rays of light emitted from an external light source and entering the micro-lens 7 are focussed at a spot near the micro-aperture 3.

A micro-lens 7 (refractive index lens) to be used for the purpose of the present invention refers to a spherical or non-spherical single lens that is not divided into zones and adapted to converge rays of light by refraction at the surface thereof.

For the purpose of the invention, the diameter of the micro-lens 7 of the optical probe is determined as a function of the height of the projection 4, the thickness of the cantilever 2 and the refractive index of the micro-lens 7. For instance, if the refractive index n of the micro-lens 7 is n=1.48, the height of the projection 4 is 10 $\mu$m and the thickness of the cantilever 2 is 3 $\mu$m. the micro-lens 7 preferably has a radius of about 5 $\mu$m.

The micro-lens 7 of a probe according to the invention is constantly held in contact with the cantilever 2 so that the focal point of the micro-lens 7 does not fluctuate relative to the micro-aperture 3 if the cantilever 2 is deflected. Thus, it is possible to observe specimens through a near field optical microscope comprising an optical probe according to the invention, under the constant strength of the cantilever, regardless of the deflection of the cantilever 2. Additionally, since the micro-lens is a refractive index lens, it is adapted to transmit light to a spot near the micro-aperture more efficiently than a Fresnel lens so that it can improve the detection sensitivity of the near field optical microscope.

Additionally, an optical probe according to the invention can be used in a near field photolithography apparatus. In other words, it is possible to bring an optical probe according to the invention close to the photoresist formed on a substrate and expose the latter to evanescent light that is seeping out from the micro-aperture of the probe. A number of probes according to the invention may be arranged in multiple in an integrated fashion in order to raise the intensity of evanescent light. Then, the lithography operation can be conducted at an enhanced rate.

It is also possible to apply an optical probe to an information storage apparatus (recording/reproducing apparatus). With such an apparatus, information will be recorded by bringing the optical probe close to the recording layer formed on a substrate and modifying the surface condition of the recording layer by means of the evanescent light that is seeping out from the micro-aperture. For retrieving the recorded information, the recording layer is irradiated with light showing a power level lower than the light used for the recording or having a wavelength different from the latter in order not to change the surface condition of the recording layer, and the rays of light scattered by the recording layer are picked up by a light receiving device. The transfer rate of such an apparatus can be improved by using a multi-probe carrying a plurality of optical probes according to the invention. Then, the pieces of information picked up by the respective probes can be independently detected when the cantilevers of the optical probes are provided with respective light receiving devices.

According to the invention, there is also provided a method of manufacturing such an optical probe. Japanese Patent Application Laid-Open No. 09-269329 describes a method of manufacturing a probe comprising a cantilever and a projection having a micro-aperture and arranged on the cantilever. However, it does not described a process of combining a cantilever and a refractive index micro-lens. This is because it has been difficult to make a process of preparing a micro-lens match with a process of preparing a cantilever and a projection having a micro-aperture.

According to the invention, it is now possible to provide a probe comprising a cantilever, a projection having a micro-aperture and a refractive index micro-lens, of which the projection and the micro-lens are arranged at the free end of the cantilever, by either of the two methods as described below. Additionally, the manufacturing process can be repeated accurately to produce high precision probes.

(1) Forming a semispherical recess on the surface of a substrate, subsequently forming a refractive index micro-lens and a cantilever material layer by using the recess as a mold and then forming a projection having a micro-aperture on the junction layer formed on the cantilever material layer.

(2) Forming a plating aperture in the cantilever material layer formed on a substrate, forming a projection having a micro-aperture on the junction layer formed on the cantilever material layer, exposing the plating opening to the outside by etching the substrate from the rear surface and then growing a semispherical electrodeposited layer for a refractive index lens from the plating aperture by means of an electrodeposition system.

Either of the two methods as will be described below can appropriately be used for producing a projection having a micro-aperture as referred to in both (1) and (2) above. Since the process of forming a projection can be conducted independently from the process of forming a cantilever and a micro-lens with either method, they can be combined effectively without any problem.

Figure 2A:
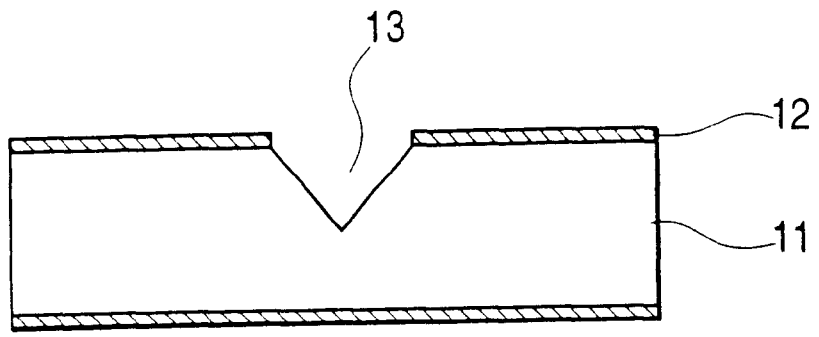
FIGS. 2A, 2B and 2C are schematic cross sectional views of the first embodiment of the optical probe illustrating part of the manufacturing steps.
Figure 2B:
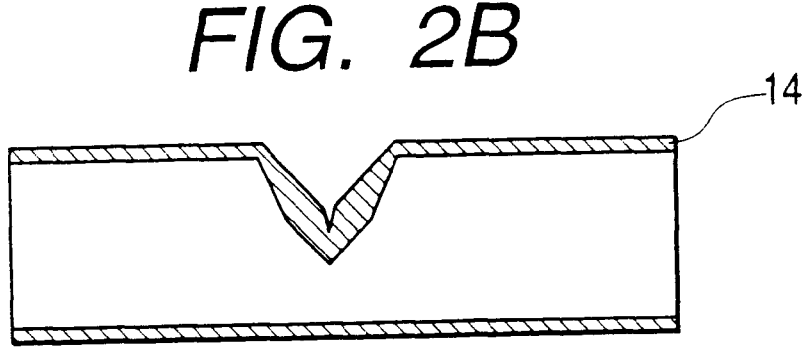
Figure 2C:
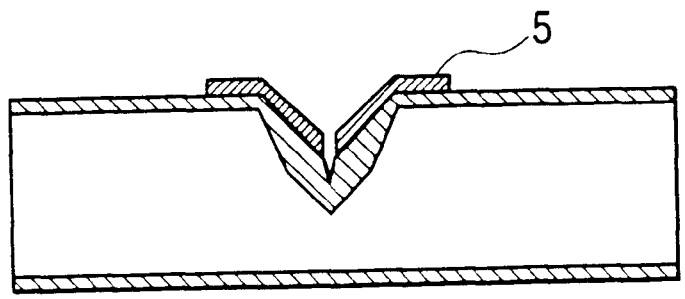
Figure 3A:
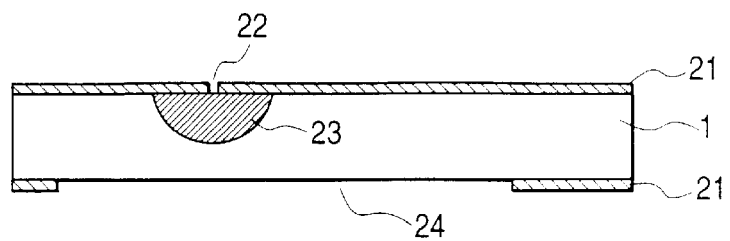
FIGS. 3A, 3B, 3C, 3D, 3E and 3F are schematic cross sectional views of the first embodiment of the optical probe illustrating the rest of the manufacturing steps.
Figure 3B:
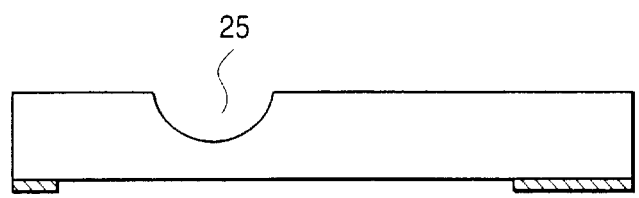
Figure 3C:
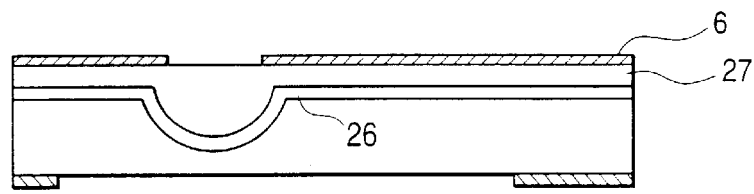
Figure 3D:
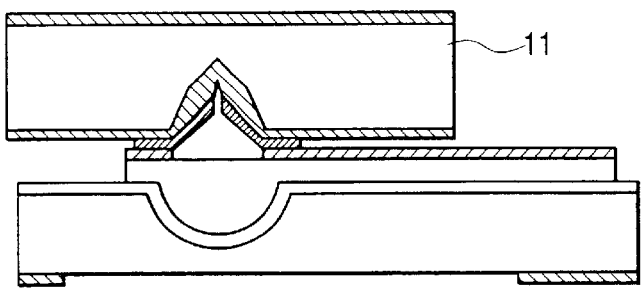
Figure 3E:
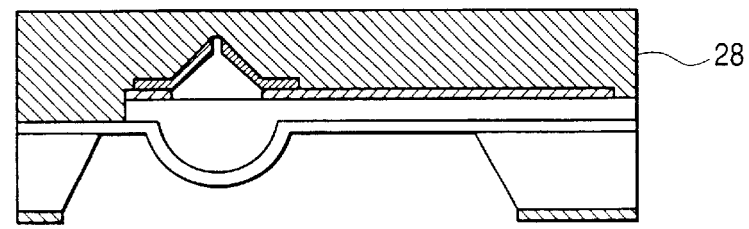
Figure 3F:
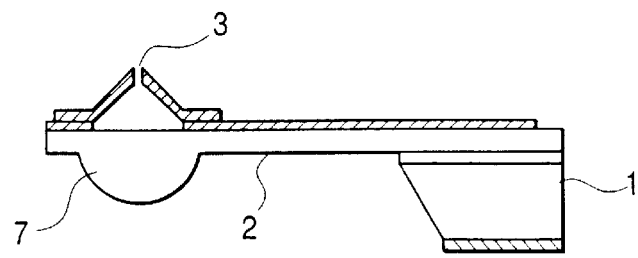

With a first method of producing a projection, firstly, a peelable layer having a pointed recess is formed on a substrate, and then a light-shielding layer is formed thereon by means of oblique evaporation to produce a projection with a micro-aperture at the front end thereof, as shown in FIGS. 2A through 2C. Then, the light-shielding layer is bonded to the junction layer. of an unfinished cantilever, as shown in FIGS. 3A through 3F.

With a second method of producing a projection, firstly, a peelable layer having a pointed recess is formed on a substrate, and then a light-shielding layer is formed thereon to produce a pointed hollow projection, as shown in FIGS. 5A through 5C. Then, the light-shielding layer is bonded to the junction layer of an unfinished cantilever and, subsequently, a thickness-regulating layer is formed and etched to expose the front end of the projection, as shown in FIGS. 7A through 7E. Finally, the front end of the projection is etched to produce a micro-aperture. The thickness-regulating layer is arranged in such a way that its thickness is reduced at the front end of the projection so that only the front end of the projection may be exposed when it is etched. The thickness-regulating layer may suitably be made of PSG (phosphosilicate glass) which has thermal plasticity.

With either of the above two methods it is possible to fill the inside of the projection with a light transmitting material in order to increase the refractive index of the inside of the projection and make the refractive index lens 7 operate as a solid immersion lens. With such an arrangement, the efficiency of converging rays of light to the micro-aperture of the lens can be improved. If the solid immersion lens has a refractive index of n, light entering the lens with wavelength $\lambda$ is made to show a wavelength of $\lambda/n$ within the solid immersion lens. Then, the diameter of the spot of focussed light can be reduced to $1/n$ of that of an ordinary optical system (Appl. Phys. Lett. Vol. 57, No. 24, 2615 (1990)). Furthermore, the spot diameter can be further reduced to $1/n^2$ when a super-semispherical solid immersion lens is used (Appl. Phys. Lett. Vol. 65 No. 4, 388 (1994)).

With these techniques, it is now possible to remarkably improve the resolution of an optical microscope and to record optical data with a very high density. Additionally, there has been a proposal for mounting a solid immersion lens onto the free end of a cantilever (Appl. Phys. Lett. Vol. 72, No. 22, 2779 (1998)). A cantilever mounted with a solid immersion lens operation as an atomic force microscope (AFM), and then the gap separating the cantilever probe and the specimen to be examined by the cantilever/solid immersion lens assembly can be controlled with ease. Additionally, with such an arrangement, it is possible to prevent any undesired large load from being applied between the probe and the specimen.

Either of the techniques as described below can suitably be used for forming a semispherical recess on the surf ace of a substrate in the process of preparing a refractive index micro-lens by means of the above method (1).

With a first technique, a mask layer is formed on the substrate and an etching aperture is formed therethrough. Then, the substrate is exposed to a solution at the surface and used as anode for electrolysis in order to process a semispherical region centered at the etching aperture and produce a semispherical recess. When processing a semispherical region, it may be directly etched by electrolytic etching to produce a semispherical recess or, alternatively, it may be turned into a porous region by means of anodic oxidation and then etched either directly or after oxidizing the porous region to produce a semispherical recess as shown in FIGS. 3A through 3F. The material suitable for the substrate is silicon if the substrate is to be subjected to anodic oxidation.

With a second technique, an electrode layer and a plating mask layer are formed on a substrate and, subsequently, a plating aperture is formed therethrough. Then, a semispherical structure that is centered at the plating aperture is formed by plating and, thereafter, a mold member is formed thereon. A semispherical recess is produced when the mold and the remaining portion are separated from each other.

With the above method (2) for manufacturing a refractive index micro-lens, such a micro-lens is produced by selecting a light-transmitting material for the cantilever and also for the electrodeposition. Materials that are light-transmitting and can be used for electrodeposition for the purpose of the invention include acryl-type carbonic acid resin materials, in the case of anionic electrodeposition, and epoxy-type resin materials, in the case of cationic electrodeposition, although other materials good for electrodeposition may also be used for the purpose of the invention.

According to the invention, a cantilever-type probe carrying a projection having a micro-aperture and a refractive index micro-lens can be prepared by appropriately using a process as described above.

Now, the present invention will be described by way of examples.

EXAMPLE 1

In this example, a probe was prepared by means of a method according to the invention used in a preferred mode of carrying out the invention.

FIG. 1 is a schematic perspective view of the cantilever prepared in this example. As shown in FIG. 1, the probe comprises a cantilever 2 supported on a substrate 1, a hollow pyramidal projection 4 arranged at the free end of the cantilever and having a micro-aperture 3 at the front end thereof and a micro-lens 7 (refractive index lens) so that the rays of light entering the micro-lens 7 are focussed to a spot near the micro-aperture 3. The projection 4 is formed from a light-shielding layer 5 so that no light may leak out through other than the micro-aperture 3. The projection 4 is bonded to the junction layer 6 of the cantilever 2. While the junction layer 6 is made of metal and does not transmit light therethrough, it has an aperture at a position corresponding to the micro-aperture 3 of the junction layer 6 so that the light passing through the micro-lens 7 then gets to the micro-aperture 3. The cantilever 2 has a two-layer structure and comprises a light-transmitting resin layer 27 and a light-shielding junction layer 6. A semispherical micro-lens 7 is arranged in the resin layer 27 at a position corresponding to the micro-aperture 3.

The method used for preparing the probe in this example will be described by referring to FIGS. 2A through 2C and FIGS. 3A through 3F.

Firstly, a single crystal silicon wafer of planar bearing (100) was brought in as substrate 11 for molding a projection and a silicon thermally oxidized film was formed to a thickness of 100 nm as a protection layer 12.

Then, the surface protection layer 12 was subjected to a patterning operation for a desired spot thereof to expose the silicon substrate of a square having a side of 14 μm by means of photolithography and etching using an aqueous solution of hydrogen fluoride and ammonium fluoride. Thereafter, the silicon of the patterned area was etched by means of crystal-axis-anisotropic etching using an aqueous solution of 30% potassium hydroxide heated to 90° C. As a result, an inverted pyramid-like recess 13 defined by four planes equivalent to plane (111) was produced with a depth of about 10 μm (see FIG. 2A). The angle $\theta_1$ between each of the four planes of the recess and the surface of the substrate that was defined by the crystal bearing was about 55°.

After removing the protection layer 12 by means of an aqueous solution of hydrogen fluoride and ammonium fluoride, a peelable layer 14 was formed by depositing silicon dioxide to a thickness of 400 nm by means of thermal oxidation using a mixture gas of hydrogen and oxygen heated to 1,000° C. (see FIG. 2B).

As a result of this process, the recess 13 became pointed at the front end thereof and the angle $\theta_2$ between each of the inner walls of the front end and the surface of the substrate became about 75°.

Then, gold Au was deposited to a thickness of 100 nm on the projection mold substrate 11 to produce a light-shielding layer 5 by means of vacuum evaporation. During this process of depositing Au by evaporation, the angle between the line connecting the projection mold substrate 11 and the source of evaporated Au and the surface of the projection mold substrate 11 was maintained to 65°, and the projection mold substrate 11 was made to revolve in the intraplanar direction. As a result, a spot free from Au deposition (micro-aperture) was produced at the front end of the recess 13. Then, the light-shielding layer 5 was patterned by means of photolithography and etching (see FIG. 2C).

Thereafter, a P-type (100) single crystal silicon substrate (0.1 to 0.2 Ωcm) was brought in for a support substrate 1 and a silicon nitride film was formed on the front and rear surfaces of the support substrate 1 as a mask layer 21 to a thickness of 1 μm by means of low pressure chemical vapor deposition (LPCVD) using ammonium gas and dichlorosilane gas. Then, the mask layer 21 on the front surface was patterned to produce an opening 22 for forming an anode. Additionally, the mask layer 21 on the rear surface was patterned to produce an opening 24 for etching (see FIG. 3A).

A semispherical section 23 of porous silicon was formed to a radius of 8 μm by means of anodic oxidation. During this anodic oxidation process, the front surface of the support substrate 1 was made to contact a concentrated hydrofluoric acid solution (49% HF) additionally containing ethanol, and a platinum mesh electrode was arranged as a cathode at the solution side while a gold-coated copper plate was arranged as an anode on the rear surface of the support substrate 1. The anodic oxidation was conducted with a current density of 5A/dm$^2$. Then, the porous silicon of the semispherical section 23 was thermally oxidized at 300° C. for 60 minutes in an oxygen atmosphere to produce silicon dioxide there. After removing the front surface mask layer 21 by means of dry etching using carbon tetrafluoride gas, the silicon dioxide of the semispherical section 23 was removed by means of etching using an aqueous solution of a mixture of hydrofluoric acid and ammonium fluoride to produce a semispherical recess 25 (see FIG. 3B).

Subsequently, a silicon dioxide film was formed as an etching stop layer 26 to a film thickness of 300 nm on the front surface of the support substrate 1 by thermal oxidation. Then, drops of photopolymer that was to be set by ultraviolet rays were made to fall into the mold to produce a resin layer 27, which was then set by irradiating it with ultraviolet rays. Thereafter, the resin layer 27 was polished until it showed a thickness of 3 μm. Then, a titanium Ti film and a gold Au film were sequentially formed on the resin layer 27 to respective thicknesses of 3 nm and 50 nm and patterned to produce a junction layer 6 by photolithography and etching (see FIG. 3C).

Thereafter, a cantilever 2 was produced by patterning the resin layer 27 by means of photolithography and etching. The prepared cantilever 2 was 50 μm wide and 300 μm long.

Subsequently, the light-shielding layer 5 on the projection mold substrate 11 and the junction layer 6 on the support substrate 1 were arranged vis-a-vis, aligned and brought into contact with each other. Then, the light-shielding layer 5 and the junction layer 6 were bonded together (under pressure) by applying a load thereto (see FIG. 3D).

Thereafter, the projection mold substrate 11 and the support substrate 1 were pulled away from each other to separate them along the interface of the peelable layer 14 and the projection 4. After forming a surface protection layer 28 by applying polyimide to the surface by means of spin coating, the product was heat-treated at 200° C. Then, the support substrate 1 was etched back from the etching opening 24 on the rear surface by using a TMAH aqueous solution heated to 90° C. The etching process was terminated when the etching stop layer 26 came to be exposed (see FIG. 3E). Then, the etching stop layer 26 was removed by means of an aqueous solution of a mixture of hydrofluoric acid and ammonium fluoride. Finally, the surface protection layer 28 was removed by means of oxygen plasma to free the cantilever 2 and produce a finished cantilever type probe (see FIG. 3F).

With the above described process, there was produced an optical probe in which the distance between the micro-aperture and the micro-lens does not fluctuate if the cantilever is deflected and which shows a high focussing efficiency. While the cantilever 2 of this example is shielded from light by the junction layer 6, an independent light-shielding layer may be arranged for shielding the cantilever in addition to the Junction layer 6. It will be appreciated that a non-spherical micro-lens 7 can be prepared by producing a potential distribution in the support substrate 1 during the anodic oxidation. A non-spherical lens can reduce the spherical aberration and increase the effective area of lens.

A near field optical microscope was prepared by using the probe of this example. Some of the effects of using such a microscope will be discussed by referring to FIG. 4.

Firstly, specimen 81, arranged on a specimen stage 82, is brought close to the micro-aperture 3 of the probe. As the micro-lens 7 of the probe is irradiated with a laser beam by means of laser 83 under this condition, the laser beam is focussed by the micro-lens 7 to a spot near the micro-aperture 3. Evanescent light is seeping out from the micro-aperture 3, and hence optical information can be collected from the surface of the specimen by detecting the light scattered by the surface of the specimen by means of a photodetector 84.

In this experiment, specimens could be observed reliably with an improved detection sensitivity by using the probe of this example. Additionally, the emission of scattered light and heat from the rear surface side of the micro-aperture could be suppressed along with the emission of heat from the light source.

EXAMPLE 2

In this example, a probe was prepared by means of a method according to the invention used in another preferred mode of carrying out the invention.

The probe of this example has a configuration the same as that of the probe of Example 1 shown in FIG. 1.

The method used for preparing the probe of this example will be described by referring to FIGS. 5A through 5C, FIGS. 6A through 6E and FIGS. 7A through 7E.

Firstly, an inverted pyramid-like recess 13 and a peelable layer 14 of silicon dioxide were formed on a projection mold substrate 11 as in Example 1 (see FIGS. 5A and 5B).

Then, gold Au was deposited to a thickness of 100 nm on the projection mold substrate 11 to produce a light-shielding layer 5 by means of vacuum evaporation (but the projection mold substrate 11 was arranged in parallel with the target surface). Then, the light-shielding layer 5 was patterned by means of photolithography and etching (see FIG. 5C).

Subsequently, a Ti film and an Au film were formed to respective thicknesses of 10 nm and 200 nm on a plating substrate 31, which was a silicon substrate, to produce an electrode layer 32 by sputtering. Then, a PSG (phosphosilicate glass) film was formed thereon as plating mask layer 33 to a thickness of 300 nm by means of atmospheric CVD (chemical vapor deposition) at 350° C. The plating mask layer 33 was patterned to produce a plating opening 34.

Then, the plating substrate 31 was Ni-plated by using the electrode layer 32 as a cathode in a Ni-plating bath containing nickel sulfate, nickel chloride, boric acid and a brightening agent, at 50° C. with a cathodic current density of 5A/dm$^2$. During this process, a Ni-plate was deposited in the plating opening 34 and then made to grow and spread over the plating mask layer 33. Finally, the plating layer showed a semispherical profile with a radius of 8 $\mu$m (see FIG. 6A)

Then, a sacrifice layer 35 of PSG was formed to a film thickness of 500 nm by means of atmospheric CVD at 350° C. Then, a Ti film and an Au film were sequentially formed to respective thicknesses of 10 nm and 200 nm to produce a mold electrode 36 by sputtering. Subsequently, the work was Ni-plated by using the mold electrode layer 36 as a cathode to produce a Ni mold 37.

Then, once again, a Ti film and an Au film were sequentially formed on the surface of the mold 37 to respective thicknesses of 10 nm and 200 nm by sputtering and resist was applied thereon. The applied resist was patterned by photolithography. Then, the Ti film layer was etched by means of an aqueous solution of a mixture of ammonium hydroxide and hydrogen peroxide and the Au film layer was etched by means of an aqueous solution of a mixture of iodine and potassium iodide to produce an etching mask 38 (see FIG. 6B).

Figure 6A:
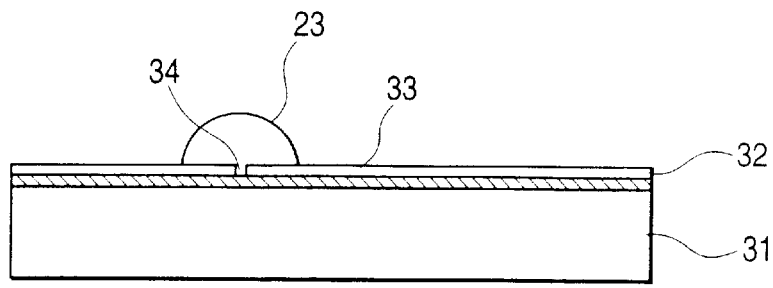
FIGS. 6A, 6B, 6C, 6D and 6E are schematic cross sectional views of the second embodiment of the optical probe of the invention illustrating other parts of the manufacturing steps.
Figure 6B:
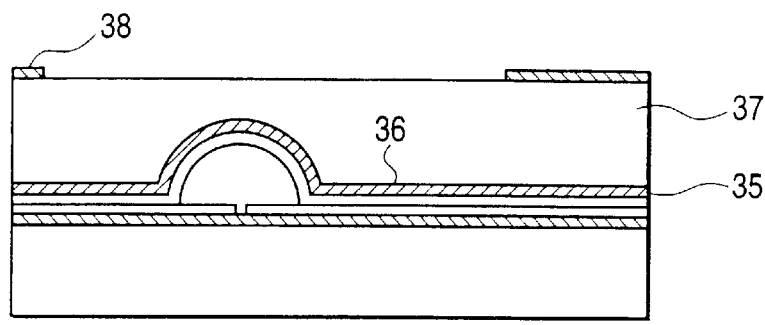
Figure 6C:
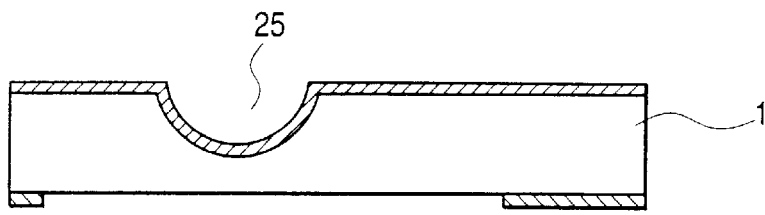
Figure 6D:
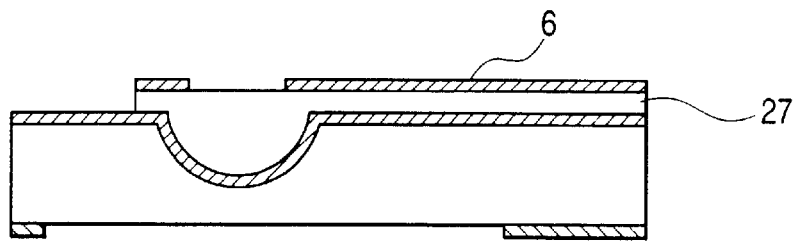
Figure 6E:
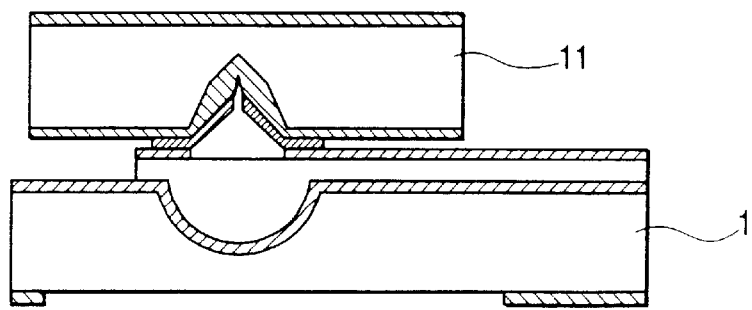

Then, the PSG of the sacrifice layer 35 was removed by etching, using an aqueous solution of a mixture of hydrofluoric acid and ammonium fluoride, and the mold 37 was peeled off from the plating substrate 31 to produce a support substrate 1 (see FIG. 6C).

Then, drops of photopolymer that was to be set by ultraviolet rays were made to fall into the mold to produce a resin layer 27, which was then set by irradiating it with ultraviolet rays. Thereafter, the resin layer 27 was polished until it showed a thickness of 3 $\mu$m.

Then, a titanium Ti film and a gold Au film were sequentially formed on the resin layer 27 to respective thicknesses of 3 nm and 50 nm and patterned to produce a junction layer 6 by photolithography and etching. Thereafter, a cantilever 2 was produced by patterning the resin layer 27 by means of photolithography and etching. The prepared cantilever 2 was 50 $\mu$m wide and 300 $\mu$m long (see FIG. 6D).

Subsequently, the light-shielding layer 5 on the projection mold substrate 11 and the junction layer 6 on the support substrate 1 were arranged vis-a-vis, aligned and brought into contact with each other. Then, the light-shielding layer 5 and the junction layer 6 were bonded together (under pressure) by applying a load thereto (see FIG. 6E).

Thereafter, the projection mold substrate 11 and the support substrate 1 were pulled away from each other to separate them along the interface of the peelable layer 14 and the projection 4.

Figure 7A:
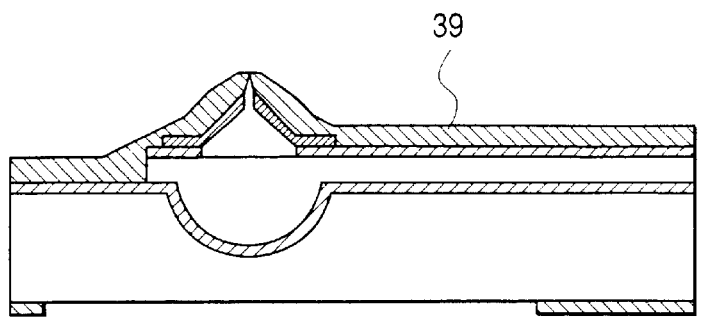
FIGS. 7A, 7B, 7C, 7D and 7E are schematic cross sectional views of the second embodiment of the optical probe of the invention illustrating the rest of the manufacturing steps.

Then, a PSG film was formed on the surface of the support substrate 1 to a thickness of 50 nm by means of atmospheric CVD at 350° C. to produce a thickness-regulating layer 39 (see FIG. 7A).

Figure 7B:
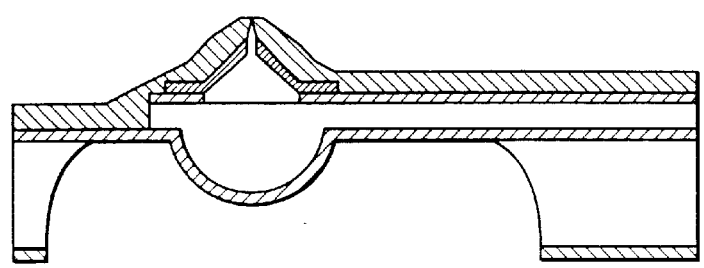

Then, the support substrate 1 was partly etched back from the opening on the rear surface by using an aqueous solution of a mixture of nitric acid, acetic acid and acetone (see FIG. 7B).

Figure 7C:
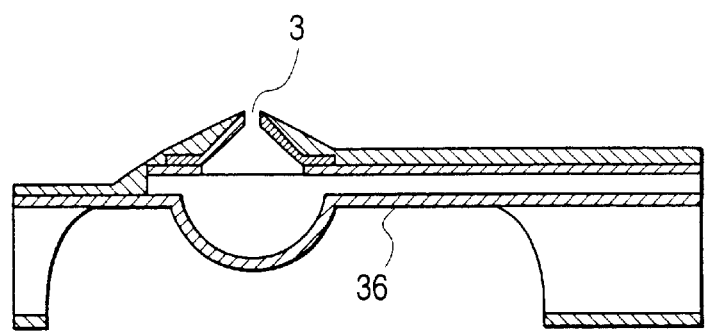

Then, the thickness-regulating layer 39 and the front end of the projection 4 were dry-etched by using argon gas to produce a micro-aperture 3 with a diameter of 100 nm (see FIG. 7C).

Figure 7D:
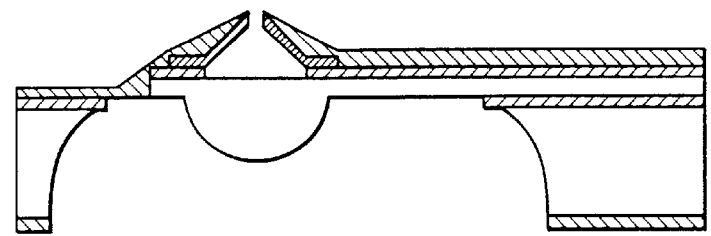

Then, the mold electrode 36 of Ti and Au was partly removed from the rear surface by means of wet etching (see FIG. 7D).

Figure 7E:
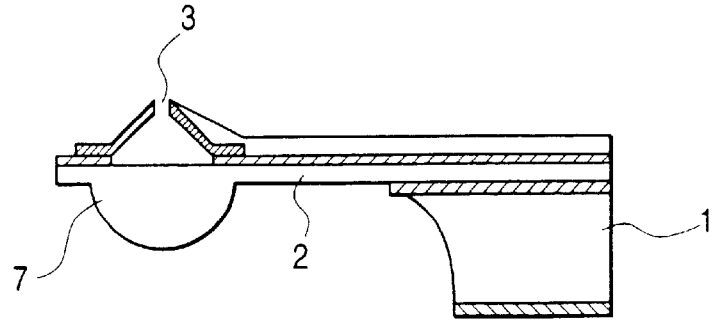

Finally, the remaining thickness-regulating layer 39 was removed by means of an aqueous solution of a mixture of hydrofluoric acid and ammonium fluoride (see FIG. 7E).

With the above described process, there was produced an optical probe in which the distance between the micro-aperture and the micro-lens does not fluctuate if the cantilever is deflected and which shows a high focussing efficiency. It will be appreciated that a non-spherical micro-lens 7 can be prepared by massively applying resist to produce a thick sacrifice layer 35 after the step of FIG. 6A in order to make the recess of the mold non-spherical.

EXAMPLE 3

In this example, a probe was prepared by means of a method according to the invention used in still another preferred mode of carrying out the invention.

The probe of this example has a configuration the same as that of the probe of Example 1 shown in FIG. 1.

The method used for preparing the probe of this example will be described by referring to FIGS. 8A through 8E.

Firstly, an inverted pyramid-like recess 13, a peelable layer 14 of silicon dioxide and a light-shielding layer 5 having a micro-aperture 3 were formed on a projection mold substrate 11 in a manner as described above for Example 1 by referring to FIGS. 2A through 2C.

Thereafter, a single crystal silicon substrate of planar bearing (100) was brought in for a support substrate 1, and a silicon dioxide layer 41 was formed on the front and rear surfaces of the support substrate 1 to a thickness of 500 nm. Then, a silicon nitride layer 42 was formed also on the front and rear surfaces to a thickness of 1 $\mu$m by means of low pressure chemical vapor deposition (LPCVD) using ammonium gas and dichlorosilane gas.

Then, the silicon nitride layer 42 and the silicon dioxide layer 41 on the rear surface were patterned by means of photolithography and etching to produce an etching opening 24. Thereafter, the silicon nitride layer 42 on the front surface was patterned In a similar manner to produce a cantilever. Subsequently, the silicon nitride layer 42 and the silicon dioxide layer 41 on the front surface were patterned to produce a plating opening 34.

Then, a Ti film and an Au film were sequentially formed on the front surface of the support substrate 1 to respective thicknesses of 10 nm and 200 nm by sputtering and resist was applied thereon. The applied resist was patterned by photolithography. Then, the Ti film layer was etched by means of an aqueous solution of a mixture of ammonium hydroxide and hydrogen peroxide and the Au film layer was etched by means of an aqueous solution of a mixture of iodine and potassium iodide to produce a junction layer 6. The junction layer 6 had an opening centered at the plating opening and partly extended to the plating opening as wire so that it operated as plating electrode in a subsequent step (see FIG. 8A).

Subsequently, the light-shielding layer 5 on the projection mold substrate 11 and the junction layer 6 on the support substrate 1 were arranged vis-a-vis, aligned and brought into contact with each other. Then, the light-shielding layer 5 and the junction layer 6 were bonded together (under pressure) by applying a load thereto (see FIG. 8B).

Figure 8A:
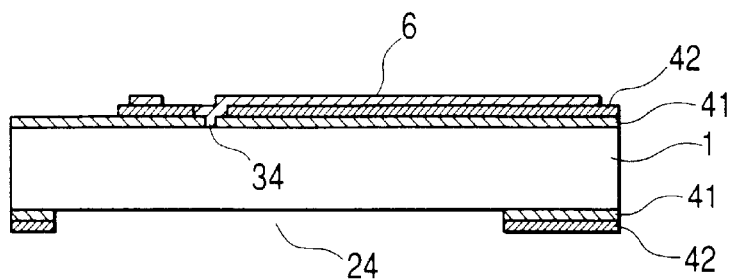
FIGS. 8A, 8B, 8C, 8D and 8E are schematic cross sectional views of a third embodiment of an optical probe according to the invention and illustrating the manufacturing steps.
Figure 8B:
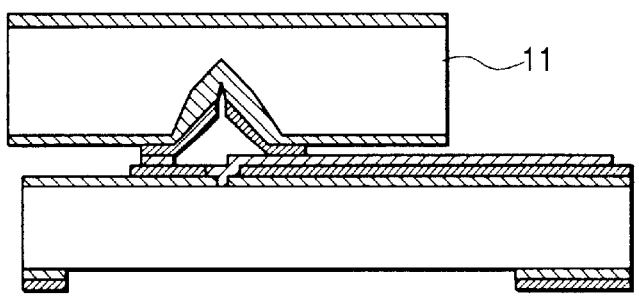
Figure 8C:
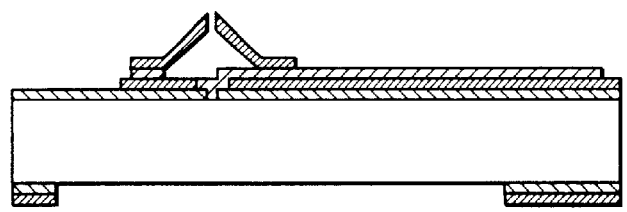
Figure 8D:
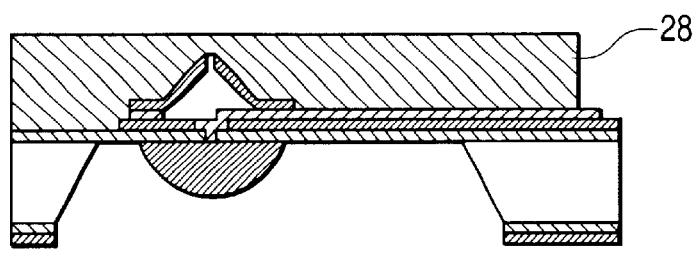
Figure 8E:
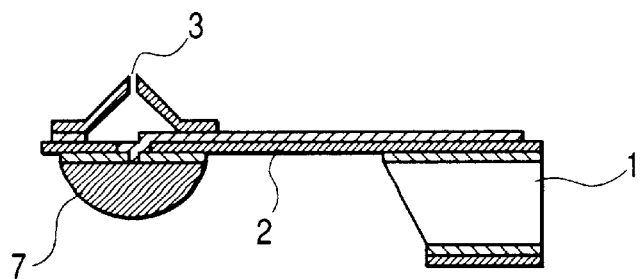

Thereafter, the projection mold substrate 11 and the support substrate 1 were pulled away from each other to separate them along the interface of the peelable layer 14 and the projection 4 (see FIG. 8C).

Then, the junction layer 6 was partly removed and resist was applied thereto by spin coating and heat-treated at 200° C. to produce a surface protection layer 28. Then, the support substrate 1 was etched back from the etching opening 24 on the rear surface by using a TMAH aqueous solution heated to 90° C. The etching process was terminated when the silicon dioxide layer 41 came to be exposed.

Then, the plating substrate 31 was subjected to an electrodeposition process, where the junction layer 6 was connected to the cathode of a cationic electrodeposition bath containing an epoxy type compound and heated to 25° C. and an anodic current density of 5A/dm$^2$ was used for the electrodeposition. During this process, an electrodeposition layer was firstly formed in the plating opening 34 and then made to grow and spread over the silicon dioxide layer 41. Finally, the electrodeposition layer showed a semispherical profile with a radius of 8 $\mu$m to operate as micro-lens 7 (see FIG. 8D).

Then, the surface protection layer 28 was removed by means of an organic solvent. Finally, the silicon dioxide layer 41 was removed by means of an aqueous solution of a mixture of hydrofluoric acid and ammonium fluoride to free the cantilever 2 and produce a finished cantilever type probe (see FIG. 8E).

With the above described process, there was produced an optical probe in which the distance between the micro-aperture and the micro-lens does not fluctuate if the cantilever is deflected and which shows a high focussing efficiency.

EXAMPLE 4

Figure 9:
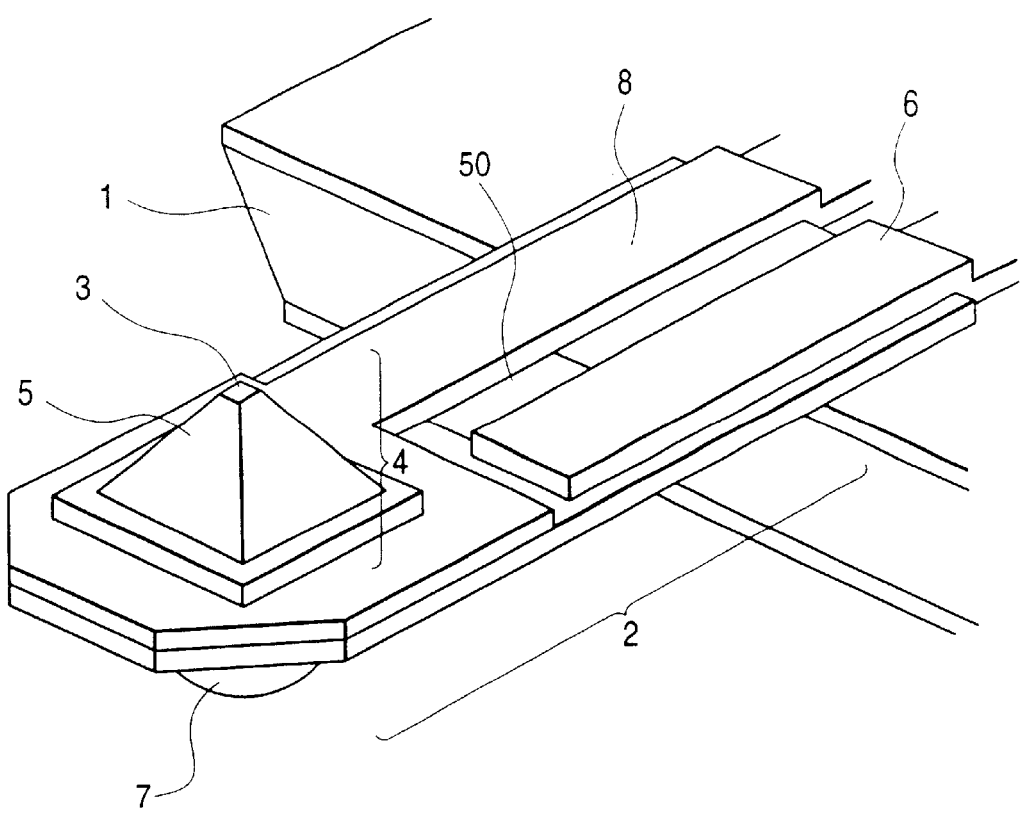
FIG. 9 is a schematic perspective view of a fourth embodiment of an optical probe according to the invention, which is shown in Example 4.

In this example, a probe shown in FIG. 9 was prepared by means of a method according to the invention used in still another preferred mode of carrying out the invention.

The probe of this example comprises a cantilever supported on a substrate, a hollow pyramidal projection 4 arranged at the free end of the cantilever and having a micro-aperture 3 at the front end thereof and a micro-lens 7 (refractive index lens) so that the rays of light entering the micro-lens 7 are focussed to a spot near the micro-aperture 3.

The cantilever 2 carriers on the front surface thereof a silicon layer including a silicon dioxide film. A junction layer 6 is formed on the cantilever 2 and then a projection 4 is bonded onto the junction layer of the cantilever 2. The projection 4 comprises a light-shielding layer 5 so that no light leaks from it except through the micro-aperture 3.

A photo detecting photodiode 50 is formed on the cantilever 2 so as to detect the evanescent light seeping out from the micro-aperture and scattered by the surface of a specimen. The junction layer 6 is divided into two parts on the cantilever 2, which operate as two wired electrodes of the photodiode 50. The junction layer 6 and the silicon layer are provided with an aperture at a position corresponding to the micro-aperture 3 so that the light passing through the micro-lens 7 then gets to the micro-aperture 3.

The method used for preparing the probe in this example will be described by referring to FIGS. 10A through 10E and FIGS. 11A through 11D.

Firstly, an inverted pyramid-like recess 13, a peelable layer 14 of silicon dioxide and a light-shielding layer 5 having a micro-aperture 3 were formed on a projection mold substrate 11 in a manner as described above for Example 1 by referring to FIGS. 2A through 2C. Thereafter, an SOI (silicon on insulator) substrate having an SOI layer of p-type silicon and a handling wafer of single crystal silicon with planar bearing (100) was brought in for a support substrate 1, and an n+ silicon part 53 and a p+ silicon part 54 were formed in a specific area of the SOI layer by means of ion implantation, using a mask of photoresist (see FIG. 10A).

Then, a silicon nitride layer 55 was formed on the front and rear surfaces to a thickness of 300 nm by means of low pressure chemical vapor deposition (LPCVD) using ammonium gas and dichlorosilane gas. Then, an opening 24 was formed by patterning the surface silicon nitride layer 55, and the SOI layer 51 and the silicon dioxide layer 52 were etched by using the silicon nitride layer 55 as a mask to produce an opening 22 for anodic oxidation.

A semispherical section 23 of porous silicon was formed to a radius of 8 µm by means of anodic oxidation. During this anodic oxidation process, the front surface of the support substrate 1 was made to contact a concentrated hydrofluoric acid solution (49% HF) additionally containing ethanol and a platinum mesh electrode was arranged as a cathode at the solution side while a gold-coated copper plate was arranged as an anode on the rear surface of the support substrate 1. The anodic oxidation was conducted with a current density of 5A/dm$^2$. Then, the porous silicon of the semispherical section 23 was thermally oxidized at 300° C. for 60 minutes in an oxygen atmosphere to produce silicon dioxide there.

After patterning the surface silicon nitride layer 55, the SOI layer 51 and the silicon dioxide layer 52 were sequentially and selectively etched to produce a cantilever, and at the same time the semispherical silicon dioxide was removed. Subsequently, an etching stop layer 26 was formed by means of thermal oxidation.

Figure 10A:
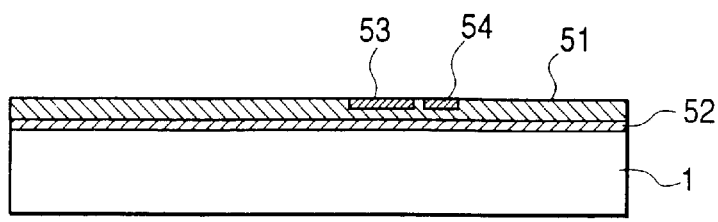
FIGS. 10A, 10B, 10C, 10D and 10E are schematic cross sectional views of the fourth embodiment of the optical probe of the invention illustrating part of the manufacturing steps.
Figure 10B:
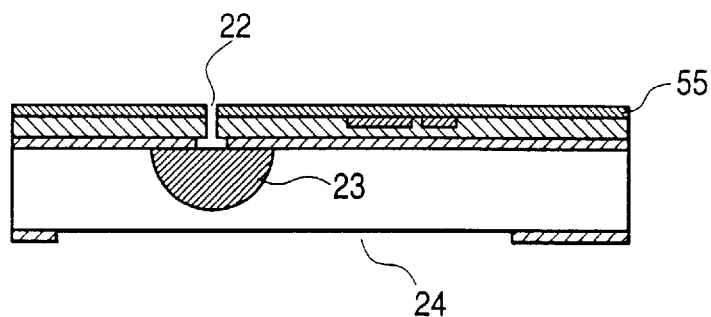
Figure 10C:
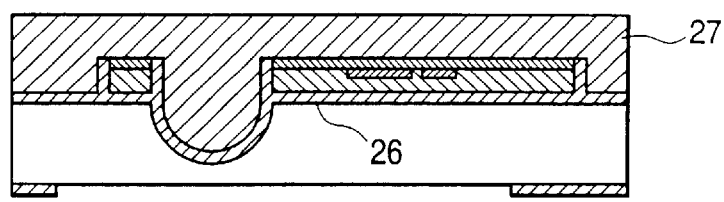
Figure 10D:
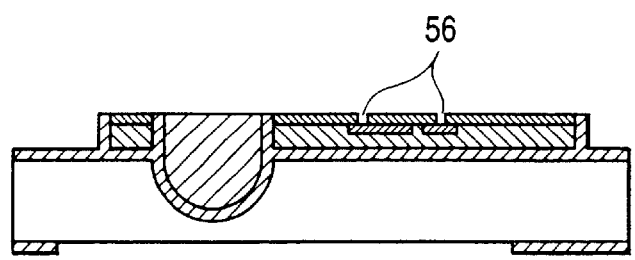
Figure 10E:
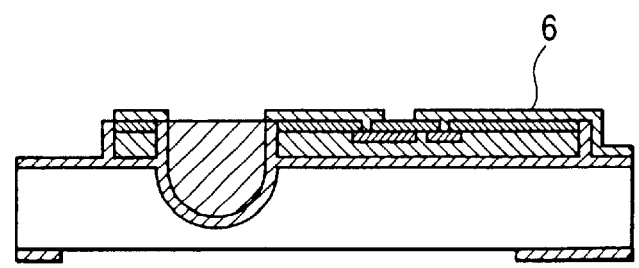

Then, drops of photopolymer that was to be set by ultraviolet rays were made to fall into the mold to produce a resin layer 27, which was then set by irradiating it with ultraviolet rays (see FIG. 10C).

Thereafter, the resin layer 27 was polished until the underlying silicon nitride layer came to be exposed. Then, the silicon nitride layer 55 and the resin layer 27 were patterned to produce a contact hole 56 and the residual resin layer 27 was removed (see FIG. 10D). Then, a titanium Ti film and a gold Au film were sequentially formed on the resin layer 27 to respective thicknesses of 3 nm and 50 nm and patterned to produce a junction layer 6 by photolithography and etching (see FIG. 10E).

In the probe of this example, the junction layer 6 operated as wired electrodes of the photodiode 50.

Subsequently, the light-shielding layer 5 on the projection mold substrate 11 and the junction layer 6 on the support substrate 1 were arranged vis-a-vis, aligned and brought into contact with each other. Then, the light-shielding layer 5 and the junction layer 6 were bonded together (under pressure) by applying a load thereto (see FIG. 11A).

Figure 11A:
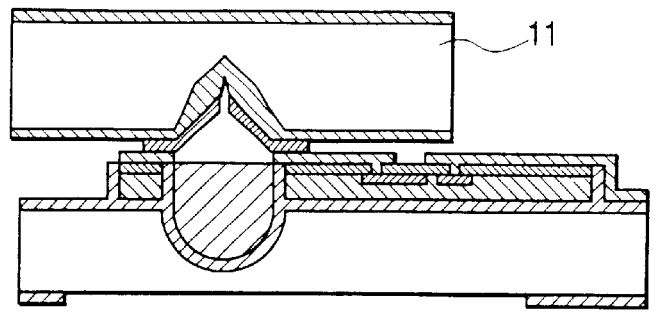
FIGS. 11A, 11B, 11C and 11D are schematic cross sectional views of the fourth embodiment of the optical probe of the invention illustrating the rest of the manufacturing steps.
Figure 11B:
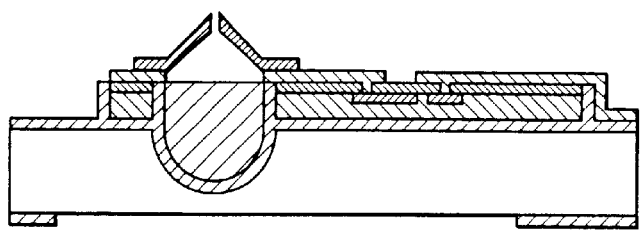
Figure 11C:
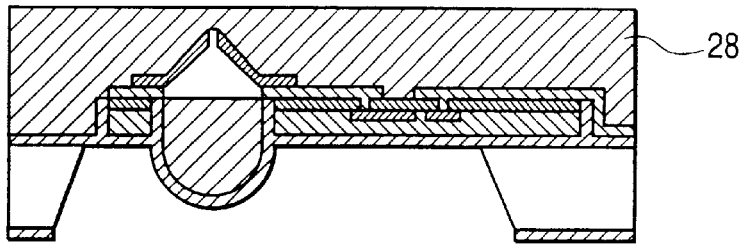

Thereafter, the projection mold substrate 11 and the support substrate 1 were pulled away from each other to separate them along the interface of the peelable layer 14 and the projection 4 (see FIG. 11C).

After forming a surface protection layer 28 by applying polyimide to the surface by means of spin coating, the product was heat-treated at 200° C. Then, the support substrate 1 was etched back from the etching opening 24 on the rear surface by using a TMAH aqueous solution heated to 90° C. The etching process was terminated when the etching stop layer 26 came to be exposed (see FIG. 11C).

Then, the etching stop layer 26 was removed by means of an aqueous solution of a mixture of hydrofluoric acid and ammonium fluoride.

Figure 11D:
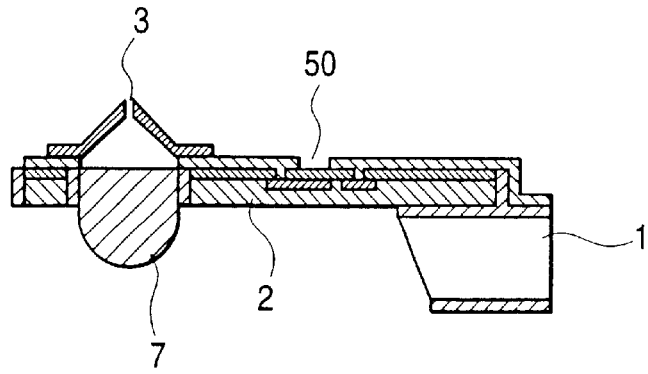

Finally, the surface protection layer 28 was removed by means of oxygen plasma to free the cantilever 2 and produce a finished cantilever type probe (see FIG. 11D).

With the above described process, there was produced an optical probe in which the distance between the micro-aperture and the micro-lens does not fluctuate if the cantilever is deflected and which shows a high focussing efficiency.

Some of the functional features of the photodiode 50 mounted on the probe of this example will be described below.

Firstly, as the light scattered by the surface of a specimen enters the n+ silicon layer 53 while the pn Junction is subjected to backward biasing, an electric current will be generated by the generated hole/electron pairs. Then, the light can be detected by means of the photodiode 50.

The photodiode can be made to operate as a highly sensitive avalanche photodiode by selecting a value close to the breakdown voltage for backward biasing. When the probe is used as a near field optical microscope having a configuration as shown in FIG. 4, the overall configuration can be simplified because there is no need of arranging a photodetector in addition to the probe. Additionally, since an SOI substrate is used for the support substrate 1 of this example, a detection circuit and other circuits may be arranged on the support substrate 1 without a problem.

EXAMPLE 5

In this example, a probe was prepared by means of a method according to the invention used in still another preferred mode of carrying out the invention. While the probe of this example is similar to the one shown in FIG. 1 and described above by referring to Example 1, the inside of the pyramidal projection 4 having a micro-aperture 3 is filled with a resin layer 27a showing a refractive index of n=1.6. The micro-lens 7 has a radius of 4 µm and the projection 4 has a height of 3 µm.

The method used for preparing the probe in this example will be described by referring to FIGS. 12A through 12E and FIGS. 13A through 13F.

Figure 12A:
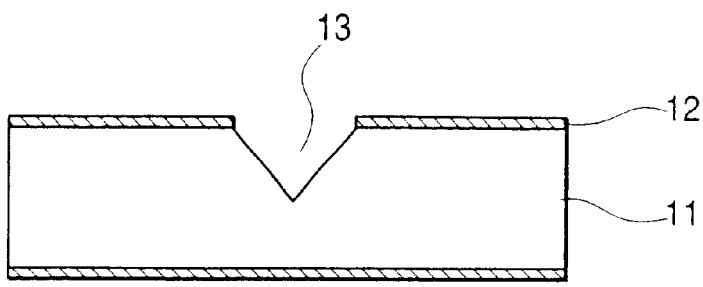
FIGS. 12A, 12B, 12C, 12D and 12E are schematic cross sectional views of a fifth embodiment of an optical probe of the invention illustrating part of the manufacturing steps.
Figure 12B:
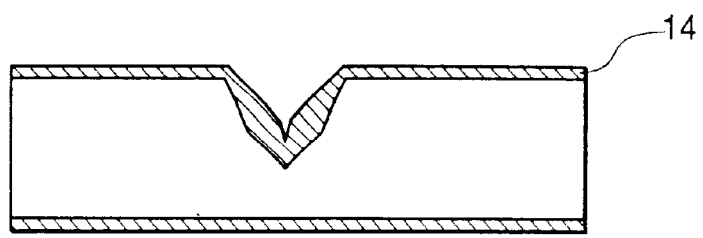
Figure 12C:
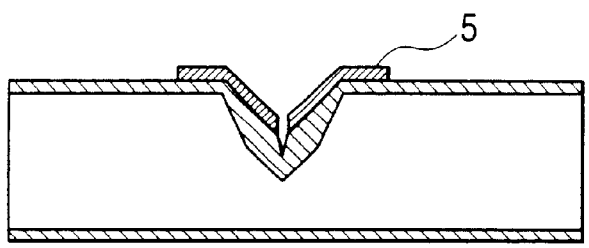

Firstly, a recess 13 and a light-shielding layer 5 were formed on a projection mold substrate 11 in a manner as described above for Example 1 by referring to FIGS. 2A through 2C (see FIGS. 12A through 12C).

Figure 12D:
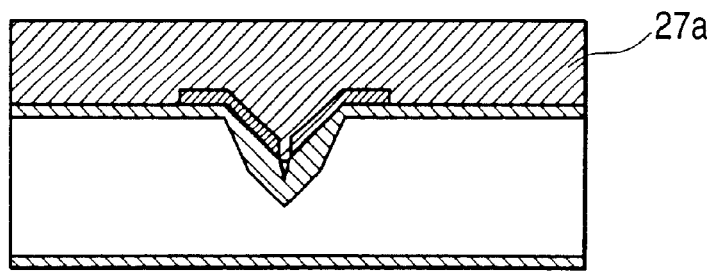

Then, drops of photopolymer that was to be set by ultraviolet rays were made to fall into the mold to produce a resin layer 27a, which was then set by irradiating it with ultraviolet rays (see FIG. 12D).

Figure 12E:
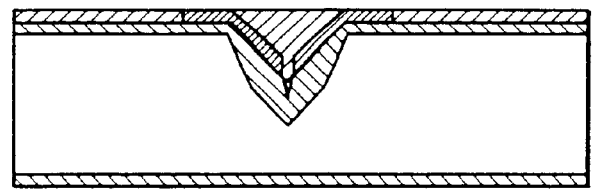

Then, the resin layer 27a was etched by means of ion etching (RIE) using oxygen gas until the surface of the light-shield layer 5 became exposed (see FIG. 12E).

Figure 13A:
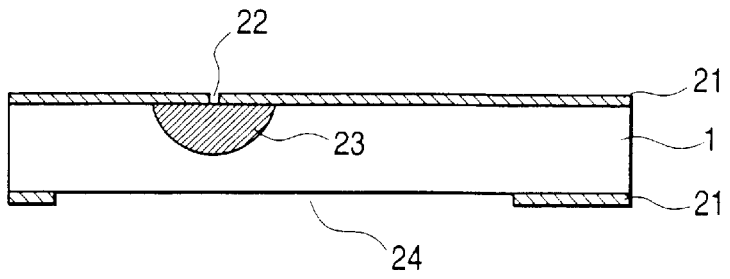
FIGS 13A, 13B, 13C, 13D, 13E and 13F are schematic cross sectional views of the fifth embodiment of the optical probe of the invention illustrating the rest of the manufacturing steps.
Figure 13B:
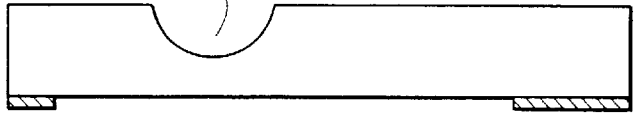
Figure 13C:
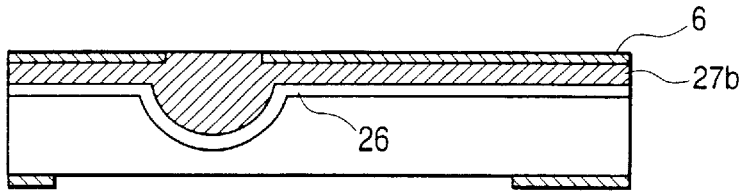
Figure 13D:
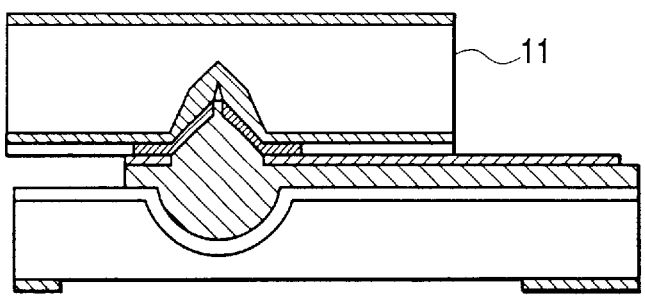
Figure 13E:
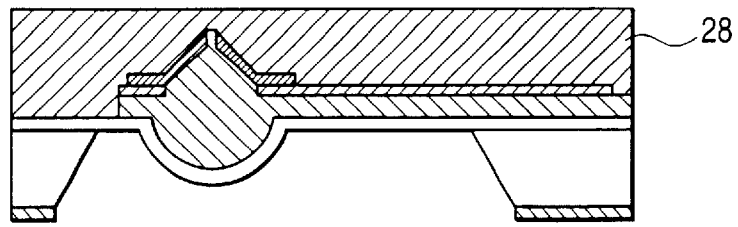

Then, a semispherical recess 25, an etch stop layer 26, a resin layer 27b and a junction layer 6 were formed on a support substrate 1 in a manner as described above by referring to Example 1 and FIGS. 3A through 3F (see FIGS. 13A through 13C).

Thereafter, a cantilever 2 was produced by patterning the resin layer 27b by means of photolithography and etching. The prepared cantilever 2 was 50 µm wide and 300 µm long.

Subsequently, the light-shielding layer 5 on the projection mold substrate 11 as shown in FIG. 12E and the junction layer 6 on the support substrate 1 were arranged vis-a-vis, aligned and brought into contact with each other. Then, the light-shielding layer 5 and the junction layer 6 were bonded together (under pressure) by applying a load thereto (see FIG. 13D).

Thereafter, the projection mold substrate 11 and the support substrate 1 were pulled away from each other to separate them along the interface of the peelable layer 14 and the projection 4. After forming a surface protection layer 28 by applying polyimde to the surface by means of spin coating, the product was heat-treated at 200° C.

Then, the support substrate 1 was etched back from the etching opening 24 on the rear surface by using a TMAH aqueous solution heated to 90° C. The etching process was terminated when the etching stop layer 26 came to be exposed (see FIG. 13E).

Then, the etching stop layer 26 was removed by means of an aqueous solution of a mixture of hydrofluoric acid and ammonium fluoride.

Figure 13F:
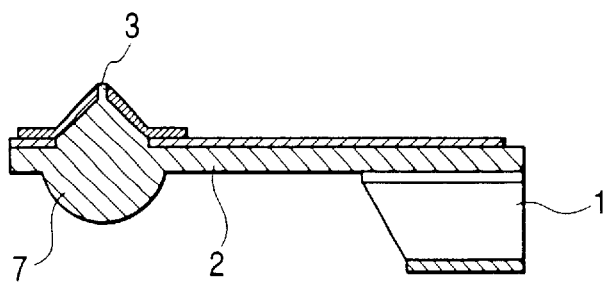

Finally, the surface protection layer 28 was removed by means of oxygen plasma to free the cantilever 2 and produce a finished cantilever type probe (see FIG. 13F).

Since the resin layer 27b of the micro-lens 7 and the resin layer 27a in the projection 4 operate as a solid immersion lens, the efficiency of focussing light to a spot close to the micro-aperture is further improved when compared with the probe of Example 1.

It will be appreciated that the projection 4 of any of the probes of Examples 2 through 4 can be filled with a light-transmitting material showing a desired refractive index by applying the steps of FIGS. 12A through 12E to it in order to utilize the micro-lens 7 as a solid immersion lens.

Figure 14:
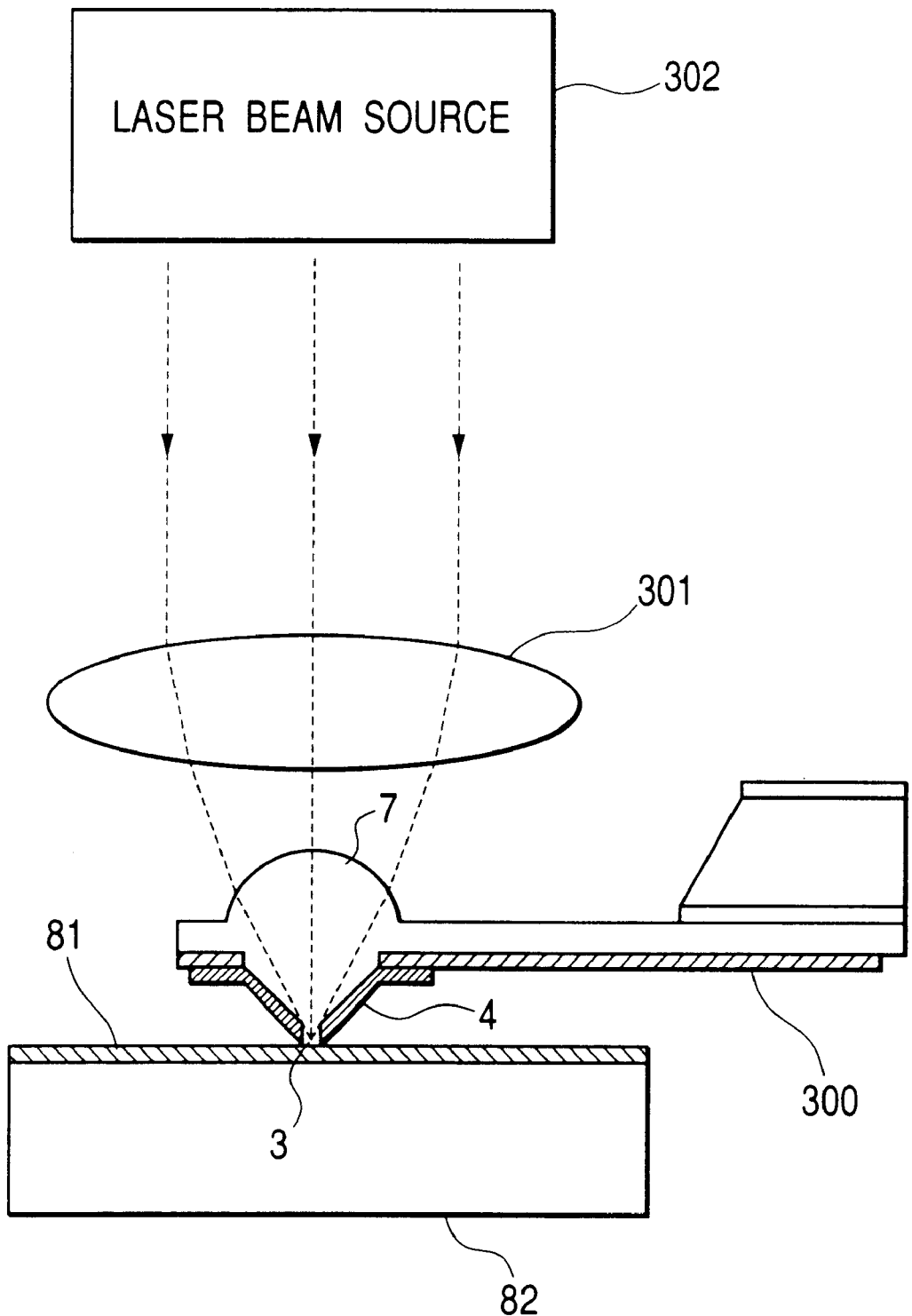
FIG. 14 is a schematic illustration of the operation of irradiating the surface of a specimen with light by means of the fifth embodiment of the optical probe.

Now, a method of irradiating the surface of a specimen with light by means of a probe 300 prepared in a manner as described above for this example will be described by referring to FIG. 14. The laser beam emitted from a laser beam source 302 is converged by a converging lens 301 arranged on the probe 300 before entering the micro-lens 7. Since the micro-lens 7 operates as super-spherical solid immersion lens, the diameter of the spot of light focussed at the front end of the projection 4 can be reduced to $1/n^2$ (n being the wavelength) of the ordinary optical system. As a result, the efficiency of focussing light to the micro-aperture 3 can be improved remarkably. A diameter smaller than the diameter of the spot of light is selected for the micro-aperture 3 so that the surface of the specimen 81 arranged on a specimen stage 82 is irradiated with near field light.

EXAMPLE 6

In this example, there was prepared a photolithography apparatus comprising a near field optical head including an array of micro-optical-heads, each of which was formed by combining an optical probe prepared in a manner as described by referring to Example 1 and a surface light emission type laser.

FIG. 15 is a schematic block diagram of a photolithography apparatus comprising a near field optical head according to the invention. Referring to FIG. 15, the near field optical head 101 is arranged vis-a-vis a piece of resist 103 on a substrate 102 that is the object to be processed.

The near field optical head 101 comprises a plurality of micro-optical-heads 118. The refractive index micro-lens 108 of each of the micro-optical-heads 118 is arranged on a cantilever 105 that is elasticly deformable along its deflecting direction and operates to focus the laser beam emitted from a surface light emission type laser 104 to a spot near the micro-aperture 106. Evanescent light is seeping out from the micro-aperture 106 and the resist 103 is exposed to it. The diameter of the micro-aperture 106 is not greater than 100 nm. The front end of the micro-aperture 106 is so arranged as to be in contact with the surface of the resist 103 on the substrate 102. With this arrangement, a photolithography operation can be conducted with dimensions smaller than 100 nm, which is shorter than the wavelength of light.

As the apparatus is operated, the cantilever 105 is elastically deformed by the atomic force, the molecular force, the van der Waals force and the surface tension generated between the front ends of the micro-apertures and the surface of the resist 103 on the substrate 102 to practically equilibrate the forces exerted by the two sides. As a result, if the entire near field optical head 101 is moved closer to the surface of the resist 103 on the substrate 102 due to an alignment error, it is not subjected to a strong repelling force, and hence neither the resist 103 nor any of the front ends of the micro-apertures 106 would not be damaged.

Each of the refractive index micro-lenses 108 focuses the laser beam passing therethrough and efficiently irradiates a spot near the corresponding micro-aperture 106 with the laser beam. Additionally, the above arrangement reduces the part of the laser beam that is ineffectively consumed by being scattered or transformed into heat at the back side of each of the micro-apertures 106 so that the heating of the components defining the micro-apertures 106 can be minimized. As a result, the drive power required for the surface light emission type lasers 104 can be reduced to lower the heating of the surface light emission type laser 104. Since a photolithography apparatus according to the invention is designed to produce exquisitely fine patterns that are smaller than 100 nm, the accuracy of exposure is significantly reduced if part or all of the apparatus is thermally expanded by heat. Additionally, the heat generated in the components defining the micro-apertures 106 can thermally degrade the resist that is arranged vis-a-vis the micro-apertures. For the above identified reasons, the performance of a photolithography apparatus can be effectively improved by arranging refractive index micro-lenses 108 and causing each of them to focus the laser beam entering it to a spot close to the corresponding micro-aperture 106.

As pointed out above, the near field optical head 101 comprises a plurality of micro-optical-heads 118 arranged in an array, and the resist 103 on the substrate 102 is exposed simultaneously to a plurality of beams of evanescent light at a plurality of spots. Obviously, this arrangement improves the throughput of the operation of the photolithography apparatus.

Now, the procedure of exposure will be described. Firstly, the near field optical head 101 and the resist 103/substrate 102 are arranged vis-a-vis and aligned relative to each other. The resist 103/substrate 102 are mounted on an xy-stage 110. The xy-stage 110 is then mounted on a drive stage for driving the xy-stage 110 stepwise in xy-directions. Then, the drive stage is mounted on an aligning mechanism 111 and the relative lateral positions, the relative gap and the relative inclination of the near field optical head 101 and the resist 103/substrate 102 are regulated by means of an aligning signal output from an aligning circuit 113

At this time, the distances separating the front ends of the micro-apertures 106 and the resist 103 can vary relative to each other due to the undulations on the surface of the Resist 103 on the substrate 102 and the dimensional errors of the near field optical head 101. Therefore, the near field optical head 101 is brought closer to the surface of the resist 103 until the front ends of all the micro-apertures 106 come to contact the surface of the resist 103. Since the micro-apertures are arranged on a cantilever, the micro-optical-head having the micro-aperture separated by a small distance from the surface of the resist elastically deforms the cantilever to a large extent, whereas the micro-optical-head having the micro-aperture separated by a large distance from the surface of the resist elastically deforms the cantilever only to a small extent so that, consequently, the forces working on every front end of the micro-apertures and the resist are practically equilibrated.

After aligning the near field optical head 101 and the resist 103/substrate 102, the resist 103/substrate 102 are two-dimensionally scanned along the xy directions relative to the near field optical head 101 according to the xy stage scan signal output from xy stage scan circuit 112. If the surface of the resist 103 on the substrate 102 is undulated and/or swerved, the cantilevers of the micro-optical-heads are elasticly deformed to follow the undulations and/or the swerves and keep the front ends of all the micro-apertures held in contact with the surface of the resist.

Then, the processing pattern data input according to the intended design is entered to processing pattern data memory 114 under this condition, and processing timing control means 115 controls the timings of operation of the xy stage scan circuit 112 and the laser drive circuit 116 according to the input data. More specifically, the processing timing control means 115 outputs an xy stage drive control signal to control the xy stage scan circuit 112, and it also outputs a laser drive control signal to control the laser drive circuit 116 and to drive the surface light emission type lasers 104 in order to expose the resist 103 to light when the micro-optical heads 118 and the resist 103/substrate 102 show a predetermined positional relationship relative to each other.

The laser drive circuit 116 is connected to each of the surface light emission type lasers 104 in the near field optical head by way of drive wires 117 so as to drive the individual surface light emission type lasers 104 independently from each other. If the surface light emission type lasers 104 are arranged in a two-dimensional array, a matrix drive technique may be used to drive the surface light emission type lasers 104 with a reduced number of drive wires 117.

A near field photolithography system according to the invention does not need to use any mask because the resist to be processed can be exposed to light by driving the surface light emission type lasers while two-dimensionally scanning the resist according to the input exposure pattern data, which reduces the time required for the production of masks. Exposure pattern data can be prepared and modified easily within a short period of time by means of a computer. Because of the above listed characteristic features of a photolithography apparatus according to the invention, it can be suitably used for preparing a variety of devices designed to specific applications such as ASICs.

EXAMPLE 7

In this example, there was prepared a storage apparatus comprising a near field optical head including an array of micro-optical-heads, each of which was formed by combining an optical probe prepared in a manner as described by referring to Example 4 and a surface light emission type laser.

FIG. 16 is a schematic block diagram of a storage apparatus comprising a near field optical head according to the invention. Referring to FIG. 16, the near field optical head 201 is arranged vis-a-vis the recording layer 203 of a substrate 202 adapted to store and reproduce information. The near field optical head 201 comprises a plurality of micro-optical-heads 218. The refractive index micro-lens 208 of each of the micro-optical-heads 218 is arranged on a cantilever 205 that is elastically deformable along its deflecting direction and operates to focus the laser beam emitted from a surface light emission type laser 204 to a spot near the micro-aperture 206. A photo-detecting photodiode 219 is arranged on the cantilever 205.

Evanescent light seeps out from the micro-aperture 206 and is used for storing data in and reproducing data from the recording layer 203.

Now, the seeping of evanescent light and the principle underlying the operation of recording and reproducing information using such evanescent light will be briefly described below. As the surface of the recording layer 203 arranged on a substrate 202 is brought close to the micro-aperture 206 from which evanescent light is seeping out, the evanescent light is scattered by the surface of the recording layer 203 and the scattered light is transmitted through the recording layer. The scattered light gives rise to changes in the absorption factor, the transmittivity and the reflectivity of minute areas of the recording layer 203 and data can be recorded by using the changes. Since the recording bit size is not limited by the wavelength of light, it can be made substantially equal to the diameter of the corresponding micro-aperture 206.

For reproducing stored data, a laser beam showing a power level lower than the threshold value of that of the recording operation or a laser beam having a wavelength that does not affect the recorded data is used and the evanescent light seeping out from the micro-aperture 206 is made to irradiate the recording layer 203. Then, the intensity of light reflected and scattered by the recording layer 203 is detected by the photodiode 219. Since an area where a recording bit is formed in the recording layer and an area where no recording bit is formed in the recording layer show absorption factors and reflection factors that are different from each other from the viewpoint of light to be used for data reproduction, the intensity of reflected light and scattered light are different in those areas. Thus, the recorded data (existence or non-existence of a recording bit) can detected by detecting the difference of intensity.

A material that shows a difference of intensity of the fluorescence or the phosphorescence generated by the evanescent light irradiated for data reproduction before and after recording data may also be used for the recording layer. If such a material is used, an area where a recording bit is formed in the recording layer and an area where no recording bit is formed in the recording layer show different intensities of the fluorescence or the phosphorescence generated by the evanescent light irradiated for data reproduction. Thus, the recorded data can be detected by detecting the difference of intensity. When such a material is used for the recording layer, the wavelength of the fluorescent or phosphorescent light used for recording data differs from that of the evanescent light used for reproducing data. Then, the S/N ratio of photodetection can be further improved by forming a thin film optical filter on the surface of the photodiode 219 to prevent the directly reflected and/or scattered evanescent light from entering the photodiode 219 and detect only the fluorescent or phosphorescent light. Then, information with a recording bit size smaller than 100 nm that is smaller than the wavelength of light can be stored in a storage apparatus according to the invention by using evanescent light seeping out from the micro-apertures 206 for the purpose of information recording and reproduction. As pointed out above, the near field optical head 201 comprises a plurality of micro-optical-heads 218 arranged in an array so that information can be recorded in or reproduced from a plurality of positions of the recording layer 203 on the substrate 202 simultaneously and concurrently. Obviously, this arrangement improves the information recording or reproducing rate.

Now, the procedure of information recording/reproduction will be described.

Firstly, the near field optical head 201 and the recording layer 203/substrate 202 are arranged vis-a-vis and aligned relative to each other. At this time, the distances separating the front ends of the micro-apertures 106 and the recording layer 203 can vary relative to each other due to the undulations on the surface of the recording layer 203 on the substrate 202 and the dimensional errors of the near field optical head 201. Therefore, the near field optical head 201 is brought closer to the surface of the recording layer 203 until the front ends of all the micro-apertures 206 come to contact the surface of the recording layer 203. Since the micro-apertures are arranged on a cantilever, the micro-optical-head having the micro-aperture separated by a small distance from the surface of the recording layer elastically deforms the cantilever to a large extent, whereas the micro-optical-head having the micro-aperture separated by a large distance from the surface of the recording layer elastically deforms the cantilever only to a small extent so that, consequently, the forces working on every front end of the micro-apertures and the surface of the recording layer are practically equilibrated. The recording layer 203/substrate 202 are mounted on an xy-stage 210. The recording layer 203/substrate 202 are two-dimensionally scanned along the xy directions relative to the near field optical head 201 according to the xy stage scan signal output from xy stage scan circuit 212. If the surface of the recording layer 203 on the substrate 202 is undulated and/or swerved, the cantilevers of the micro-optical-heads are elastically deformed to follow the undulations and/or the swerves and keep the front ends of all the micro-apertures held in contact with the surface of the recording layer.

Then, information is recorded by driving the surface light emission-type lasers in a manner as described below while conducting the above described two-dimensional scanning operation. The information to be recorded is input to recording signal decomposition circuit 220 as shown in FIG. 16. The recording signal decomposition circuit 220 decomposes (demultiplexes) the recorded information into pieces and allocates them to the micro-optical-heads in order to record them on a simultaneous and concurrent basis by means of a plurality of micro-optical-heads. The timings of operation of the xy stage scan circuit 212 and the laser drive circuit 216 are controlled according to the data on the decomposed Information to be recorded. More specifically, recording signal decomposition circuit 220 outputs an xy stage drive control signal to control the xy stage scan circuit 212, and it also outputs a laser drive control signal to control the laser drive circuit 216 and drive the surface light emission type lasers 204 independently in order to record information on the recording layer 203 when the predetermined ones of the micro-optical heads 218 and the recording layer 203/substrate 202 show a predetermined positional relationship relative to each other. The laser drive circuit 216 is connected to each of the surface light emission type lasers in the near field optical head by way of drive wires 217 so as to drive the individual surface light emission type lasers 204 independently from each other. If the surface light emission type lasers 204 are arranged in a two-dimensional array, a matrix drive technique may be used to drive the surface light emission type lasers 204 with a reduced number of drive wires 217.

The information recorded in the above-described way is reproduced in a manner as discussed below.

Referring to FIG. 16, reproduction signal synthesizing circuit 214 outputs an xy stage drive control signal to control the xy stage scan circuit 212 in a state where the laser drive circuit 216 is driving all the surf ace light emission type lasers 204. The photoelectric signals output from the photodiodes 219 of the plurality of micro-optical heads 218 are input to light intensity detection circuit 215 simultaneously and concurrently to detect the recording status (existence/non existence of recording bits) of the recording layer 203 when the near field optical head 201 and the recording layer 203/substrate 202 show a predetermined positional relationship relative to each other. The plurality of light intensity detection signals detected individually by the plurality of micro-optical heads and output from the light intensity detection circuit 215 are input to the reproduction signal synthesizing circuit 214. The reproduction signal synthesizing circuit 214 synthetically combines (multiplexes) the pieces of information from the plurality of light intensity detection signals and outputs the reproduction information while controlling the timing of the xy stage scan signal.

The storage apparatus of this example can effectively focus laser beams and causes them to irradiate respective spots close to the respective micro-apertures 206 by arranging corresponding micro-lenses 208. Additionally, the above arrangement reduces the part of the laser beam that is ineffectively consumed by being scattered or transformed into heat at the back side of each of the micro-apertures 206 so that the heating of the components defining the micro-apertures 206 can be minimized. As a result, the micro-apertures 206 are protected against destruction by heat. For the above identified reasons, the performance of the storage apparatus can be effectively improved by arranging refractive index micro-lenses 208 and causing each of them to focus the laser beam entering it to a spot close to the corresponding micro-aperture 206.

What is claimed is:

1. An optical probe comprising:

a substrate;

an elastic body supported by said substrate and having a free end;

a projection having a micro-aperture and arranged at the free end of said elastic body; and a refractive index micro-lens arranged at the free end of said elastic body and adapted to focus light to said micro-aperture.

2. An optical probe according to claim 1, wherein said projection having said micro-aperture is hollow.

3. An optical probe according to claim 1, wherein the inside of said projection having said micro-aperture is filled with a light-transmitting material and said refractive index lens operates as solid immersion lens.

4. An optical probe according to claim 1, further comprising a junction layer for bonding said projection having said micro-aperture to said elastic body.

5. An optical probe according to claim 1, further comprising a light receiving element arranged at the free end of said elastic body.

6. A near field optical microscope comprising:

an optical probe according to any one of claims 1 through 5, said projection having said micro-aperture arranged close to a specimen; and a light source for irradiating said micro-aperture with light.

7. A lithography apparatus comprising:

an optical probe according to any one of claims 1 through 5, said projection having said micro-aperture arranged close to a substrate carrying thereon a resist layer; and a light source for irradiating said micro-aperture with light.

8. A storage apparatus comprising:

an optical probe according to any one of claims 1 through 5, said projection having said micro-aperture arranged close to a recording medium; and a light source for irradiating said micro-aperture with light.

9. A method of manufacturing an optical probe comprising the steps of:

arranging an elastic material on a substrate;

forming a refractive index micro-lens in contact with said elastic material on the substrate;

forming a junction layer on said elastic material;

forming a projection with a micro-aperture on said junction layer; and forming an elastic body having a free end out of said elastic material by removing part of said substrate.

10. A method of manufacturing an optical probe according to claim 9, wherein said step of forming a refractive index micro-lens includes a step of forming a semispherical recess on said substrate and preparing said refractive index micro-lens by using said recess as mold.

11. A method of manufacturing an optical probe according to claim 10, wherein said step of forming a semispherical recess includes steps of:

forming a mask layer on the surface of said substrate;

forming an opening in said mask layer; and forming said semispherical recess with its center located at said opening by arranging a cathode in a solution, exposing the surface of said substrate to said solution, connecting the rear surface of said substrate to an anode and applying an electric field between said cathode and said anode to process said substrate from said opening.

12. A method of manufacturing an optical probe according to claim 11, wherein said step of forming a semispherical recess includes a step of producing said semispherical recess by preparing a semispherical section in said substrate through anodic oxidation of the material of said substrate and subsequently etching said semispherical section.

13. A method of manufacturing an optical probe according to claim 10, wherein said stop of forming a semispherical recess includes steps of:

forming an electrode layer on the surface of a plating substrate;

forming a plating mask layer on the surface of said electrode layer;

forming an opening in said plating mask layer;

preparing a semispherical structure with its center located at said opening through electric plating, using said electrode layer as cathode;

forming said substrate on said plating substrate having said Hemispherical structure; and producing said semispherical recess on the surface of said substrate by peeling off said substrate from said plating substrate.

14. A method of manufacturing an optical probe according to claim 9, wherein said step of forming a refractive index lens includes steps of;

forming an insulator layer on said substrate;

forming an opening in said insulator layer;

forming said junction layer on said insulator layer;

exposing said opening to the rear surface of said substrate by partly removing said substrate; and covering the exposed surface with an insulator and subsequently forming a semispherical electrodeposition layer of an organic compound through said opening by means of the electrodeposition mechanism of an organic substance using said junction layer as electrode.

15. A method of manufacturing an optical probe according to claim 9, wherein said stop of forming a projection with a micro-aperture includes steps of:

preparing a substrate having a recess formed with a pointed front end;

forming a light-shielding layer having a pointed front end by depositing a light-shielding material in said recess; and transferring said light-shielding layer onto said junction layer and subsequently forming said projection with said micro-aperture by removing a front end portion of said light-shielding layer.

16. A method of manufacturing an optical probe according to claim 9; wherein said step of forming a projection with a micro-aperture includes steps of:

preparing a substrate having a recess formed with a pointed front end;

forming a light-shielding layer having a pointed front end by depositing a light-shielding material in said recess;

forming a filled section with a pointed front end by filling light-transmitting resin on said light-shielding layer; and transferring said filled section onto said junction layer and subsequently forming said projection with said micro-aperture by removing a front end portion of said light-shielding layer.

17. A method of manufacturing an optical probe according to claim 15 or 16, further comprising a step of depositing a film thickness regulating layer on the surface of said light-shielding layer, wherein the thickness of said film thickness regulating layer is thin at the front end of said projection; exposing the front end of said light-shielding layer by etching said film thickness regulating layer; and etching the exposed front end.

18. A method of manufacturing an optical probe according to claim 17, wherein said film thickness regulating layer is made of glass containing phosphor.

19. A method of manufacturing an optical probe according to claim 9, wherein said step of forming a projection with a micro-aperture includes steps of:

preparing a substrate having a recess formed with a pointed profile;

forming a light-shielding layer having a micro-aperture at the front end thereof by depositing a light-shielding material on said recess except at said front end; and forming said projection with said micro-aperture by transferring said light-shielding layer onto said junction layer.

20. A method of manufacturing an optical probe according to claim 9; wherein said step of forming a projection with a micro-aperture includes steps of:

preparing a substrate having a recess formed with a pointed profile;

forming a light-shielding layer having a micro-aperture at the front end thereof by depositing a light-shielding material on said recess except at said front end;

forming a filled section with a pointed front end by filling light-transmitting resin on said light-shielding layer; and forming said projection with said micro-aperture by transferring said light-shielding layer onto said junction layer.

* * * * *

UNITED STATES PATENT AND TRADEMARK OFFICE
CERTIFICATE OF CORRECTION

PATENT NO.  : 6,335,522 B1
DATED       : January 1, 2002
INVENTOR(S) : Shimada et al.

It is certified that error appears in the above-identified patent and that said Letters Patent is hereby corrected as shown below:

Column 1,
Line 27, "magnetic." should read -- magnetic --;
Line 53, "a number" should read -- a large number --; and
Line 64, "microaperture" should read -- micro-aperture --.

Column 2,
Line 24, "is cantilever" should read -- cantilever --;
Line 38, "Involves" should read -- involves --; and
Line 39, "and." should read -- and --.

Column 5,
Line 19, "described" should read -- describe --; and
Line 57, "layer." should read -- layer --.

Column 6,
Line 37, "surf ace" should read -- surface --.

Column 9,
Line 18, "Junction" should read -- junction --.

Column 11,
Line 42, "In" should read -- in --.

Column 16,
Line 63, "Resist" should read -- resist --.

Column 18,
Line 43, "can" should read -- can be --.

Column 19,
Line 38, "elasticly" should read -- elastically --; and
Line 54, "Information" should read -- information --.

Column 20,
Line 9, "surf ace" should read -- surface --.

UNITED STATES PATENT AND TRADEMARK OFFICE
CERTIFICATE OF CORRECTION

PATENT NO.    : 6,335,522 B1
DATED         : January 1, 2002
INVENTOR(S)   : Shimada et al.

It is certified that error appears in the above-identified patent and that said Letters Patent is hereby corrected as shown below:

Column 21,
Line 52, "stop" should read -- step --; and
Line 63, "Hemispherical" should read -- semispherical --.

Column 22,
Line 21, "stop" should read -- step --.

Signed and Sealed this

Thirtieth Day of July, 2002

Attest:

JAMES E. ROGAN
Attesting Officer        Director of the United States Patent and Trademark Office